US011233920B1

(12) United States Patent
Wang et al.

(10) Patent No.: US 11,233,920 B1
(45) Date of Patent: Jan. 25, 2022

(54) TRANSFORMING DOCUMENT ELEMENTS FOR MODIFIED DOCUMENT LAYOUTS

(71) Applicant: Adobe Inc., San Jose, CA (US)

(72) Inventors: Xiaoyi Wang, Irvine, CA (US); Shayan Chandrashekar, San Jose, CA (US); Sangeeta Varma, San Jose, CA (US); Paul Asente, Redwood City, CA (US); Michal Lukac, San Jose, CA (US); Chang Liu, San Jose, CA (US)

(73) Assignee: Adobe Inc., San Jose, CA (US)

(*) Notice: Subject to any disclaimer, the term of this patent is extended or adjusted under 35 U.S.C. 154(b) by 0 days.

(21) Appl. No.: 16/952,137

(22) Filed: Nov. 19, 2020

(51) Int. Cl.
*H04N 1/387* (2006.01)
*G06T 3/40* (2006.01)
*H04N 1/393* (2006.01)
*H04N 1/00* (2006.01)
*G06F 3/12* (2006.01)

(52) U.S. Cl.
CPC ......... *H04N 1/3873* (2013.01); *G06F 3/1208* (2013.01); *G06F 3/1242* (2013.01); *G06T 3/403* (2013.01); *H04N 1/0044* (2013.01); *H04N 1/3871* (2013.01); *H04N 1/3935* (2013.01)

(58) Field of Classification Search
None
See application file for complete search history.

(56) References Cited

U.S. PATENT DOCUMENTS

| | | | | |
|---|---|---|---|---|
| 8,049,905 | B2 * | 11/2011 | Matsumoto | G06F 3/1245 358/1.13 |
| 8,161,384 | B2 * | 4/2012 | Atkins | G06F 40/106 715/273 |
| 2008/0062438 | A1 * | 3/2008 | Lin | G06K 9/42 358/1.2 |
| 2008/0291497 | A1 * | 11/2008 | Kuwano | G06F 3/1245 358/1.18 |
| 2018/0074999 | A1 * | 3/2018 | Cogan | G06F 3/147 |
| 2021/0182003 | A1 * | 6/2021 | Ban | G06F 40/106 |

* cited by examiner

*Primary Examiner* — Scott A Rogers
(74) *Attorney, Agent, or Firm* — Kilpatrick Townsend & Stockton LLP

(57) ABSTRACT

Methods and systems disclosed herein relate generally to systems and methods for transforming document elements in response to modifications to a layout of a document. A layout-modification application identifies, from a first document having a first document layout, a first set of measurements of a document element and a first location of the document element within the first document. Based on an aspect-ratio difference between the first document layout and a second document layout, the layout-modification application selects a set of transformation rules that specify, for the document element, a second set of measurements and a second location within a second document. To select the particular set of transformation rules, the layout-modification application uses the determined aspect-ratio difference. The layout-modification application applies the selected set of transformation rules to the document element.

18 Claims, 19 Drawing Sheets

TRANSFORMING DOCUMENT ELEMENTS FOR MODIFIED DOCUMENT LAYOUTS

TECHNICAL FIELD

This disclosure generally relates to methods that transform document elements in response to modifications to a layout of a document. More specifically, but not by way of limitation, this disclosure relates to determining specific transformations of document elements based on an aspect-ratio difference determined between an initial aspect ratio and a target aspect ratio.

BACKGROUND

Content-editing applications are used to enhance or otherwise modify documents and other graphical content. For instance, a content-editing application is used to select a portion of a document, which can be a document element (e.g., an image) depicting a person or other figure. The document element may be modified separately from the remaining portions of the document, such as relocating the document element to another part of the document. Different types of content-editing operations can be performed on the document element, including cropping, reflecting, resizing, and adjusting pixel colors.

In addition to modifying elements within the document, the content-editing applications are used to modify structure and format of the document. For example, the content-editing application performs a layout modification of the document, such that one or more dimension values (e.g., width, height) of the document are modified to have different dimension values. As these dimension values change, the content representing the document element may also be modified, usually in proportion to the modifications applied to document layout. However, the content may unintentionally distorted as a result of modifying the document layout.

Conventional content-processing systems are limited to manually resizing and repositioning document elements when a given document layout is modified. For example, a conventional technique involves inserting images (for example) into a template layout of a particular document format (e.g., HTML/CSS), in which a user may modify the images within the template layout via a user interface. When complete, the modified images are then converted into an output document. In some instances, the conventional technique allows creating user-customization rules that apply repositioning and resizing of document elements as the layout is modified into another aspect ratio. This conventional technique, however, does not support rules that are applicable to all types of layouts and can reliably reposition and resize document elements into when a source layout is modified into various types of layouts. It may be possible to convert the a non-HTML document (e.g., an image) into HTML, modify the document elements, and generate an output document. This largely manual approach, however, becomes increasingly challenging and inefficient to process a number of documents, each requiring generation of several output documents with various document layouts. In addition, the conventional technique becomes ineffective in processing documents that include complex content (e.g., background elements, foreground elements) and pixel patterns (e.g., a gradient pixel pattern of a document element).

Other conventional content-processing systems are also ineffective in transforming document elements as the document layouts are modified. For example, another known conventional technique receives a set of document elements and provides recommendations on how each document element can be positioned within a given template layout. This conventional technique, however, is ineffective in generating documents with differing document layouts based on a single input document that includes sizes and positions of its document elements, such that document elements are appropriately resized and repositioned in response to changes to the dimensions of the input document layout. Further, this conventional technique may be ineffective in processing documents with complex elements, thereby causing distortion of content as the corresponding document element is inappropriately resized and repositioned for a different document layout. Accordingly, conventional techniques are incapable of effectively and efficiently transforming document elements as the document layout is continuously modified while avoiding distortion of element content.

SUMMARY

Certain embodiments involve transforming document elements in response to modifications to a layout of a document. For example, a layout-modification application identifies a document element in an input document. In response to receiving an indication to modify the document such that the modified document has a target width and a target height, the layout-modification application identifies an aspect-ratio difference between an initial aspect ratio and a target aspect ratio. The target aspect ratio is derived from the target width and the target height. The layout-modification application uses the aspect-ratio difference as input to select a set of transformation rules to transform the document element. The document is modified to have the target width and the target height as defined by a modified document layout, in which the transformed document element represents the document element for the modified document.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
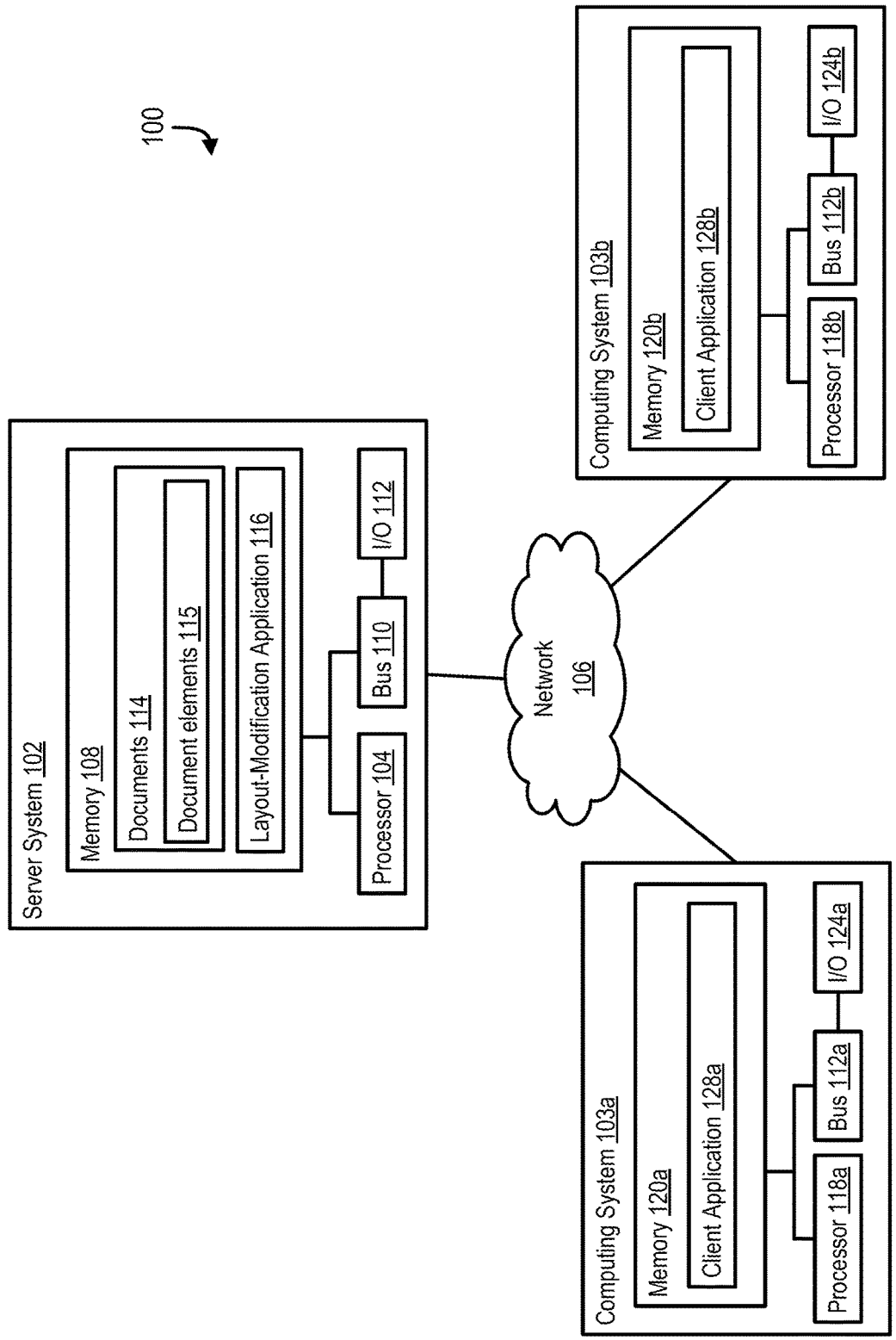
FIG. 1 illustrates a computing environment for transforming document elements for modified document layouts in accordance with some embodiments.

Certain embodiments described herein can address one or more of the problems identified above by dynamically and seamlessly transforming document elements when a document is modified to have different document layouts. A document can be a single-page or single-canvas document comprising images and/or text. In some instances, the document includes document elements, in which a document element represents an image, text, a pixel pattern, a user-interface element, other types of content, or combinations thereof. A layout-modification application accesses a document having an initial document layout. In some instances, the initial document layout (for example) includes one or more parameters that specify height, width, and/or shape of a corresponding document. An initial aspect ratio of the document can be determined from the width and height parameters of the initial document layout. In some instances, the layout-modification application uses the initial aspect ratio determine a type of layout shape for the document. For example, the layout-modification application determines that the document has a landscape layout shape if the corresponding initial aspect ratio exceeds a predetermined value (e.g., 1.2). The layout-modification application detects document elements depicted in the document. In one example, the input document is a banner document with a square document layout. The document of the example includes a background element that depicts an office space and a foreground element that depicts a brand logo. For a given document element, the layout-modification application identifies a first set of measurements of the document element and as well as a first location of the document element within the document. In the example involving a banner document, the brand-logo element is measured to identify an element width and height, and the brand-logo element is identified at a center position of the initial document.

The layout-modification application receives an indication that an initial aspect ratio of the document is being modified. For example, the indication is received via one or more user actions on a client user interface. For example, the layout-modification application detects a user input such as dragging the document to a different aspect ratio. In some embodiments, the document is modified to have a different aspect ratio from that defined by the initial document layout. In particular, the modified document layout of the output document is characterized with a target aspect ratio that is different from an aspect ratio of the initial document layout. In the above example involving a banner document, the modified document layout has a rectangular aspect ratio (e.g., 16:9) as compared to the initial document layout with a square aspect ratio (e.g., 1:1).

Continuing with this example, the layout-modification application determines an aspect-ratio difference between the initial aspect ratio of the initial document layout and a target aspect ratio, e.g., an aspect ratio indicated by the client user interface. For instance, the aspect-ratio difference for the banner document is 0.78, which is calculated between the target aspect ratio (e.g., 16:9=1.78) and the initial aspect ratio (e.g., 1:1=1). In some instances, the layout-modification application determines the aspect-ratio difference by a subtracting a lesser aspect ratio value (e.g., 1) from a greater aspect ratio value (e.g., 1.78). Based on a value indicated by the aspect-ratio difference, the layout-modification application selects a set of transformation rules that specify, for the document element, a second set of measurements and a second location within the output document. In some instances, the set of transformation rules are selected by comparing the aspect-ratio difference with a predefined threshold. For instance, the layout-modification application selects, for the banner document, the set of transformation rules relating to reflection of the document element based on the aspect-ratio difference (e.g., 0.78) exceeding a pre-defined threshold (e.g., 0.7). In some instances, the set of transformation rules are selected based on whether the document element is classified as a background element or a foreground element. In other instances, the set of transformation rules are selected based on both the aspect-ratio difference exceeding a predefined threshold and based on whether the document element is classified as a background element or a foreground element. For instance, the brand-logo element is classified as the foreground element, and a specific set of transformation rules for transforming the foreground element for the modified document layout.

The layout-modification application applies the set of transformation rules to the document element. For example, the set of transformation rules include resizing or repositioning operations that are applied to transform the document element. For example, the set of transformation rules being applied to the brand-logo element include reducing the size of the element by 50%. The layout-modification application generates a transformed document element that includes the second set of measurements. In some embodiments, the second set of measurements include different width or height values as compared the first set of measurements. In some instances, the second set of measurements are proportional to an extent of change from the initial aspect ratio of the initial document layout and the target aspect ratio indicated by the client device.

The layout-modification application modifies the document to have the target aspect ratio specified by a modified document layout. Referring to the above example, the document with the modified document layout has a rectangular aspect ratio (e.g., 16:9), and document elements of the initial document are respectively transformed as specified by the modified document layout. In addition, the document includes the transformed document element at the second location of the modified document. In some instances, the second location of the document element in the modified document with the modified document layout is different from the first location of the document element in the document with the initial document layout. For example, the second location of the brand-logo element is at the left-top corner as compared to the initial, center location of the brand-logo element within the input document, thereby preventing the document element from intersecting other document elements, or from extending beyond the boundaries of the document with the modified document layout.

Certain embodiments described herein improve content-processing systems by implementing techniques that efficiently transform and relocate document elements as the document layouts are being modified. In one example, embodiments described herein prevent or reduce distortion of content (e.g., image content such as logo, user-interface elements) that occurs using conventional techniques. By identifying a specific set of transformation rules based on a calculated aspect-ratio difference, the layout-modification application can modify and relocate document elements, such that document distortion is minimized as the document is repeatedly being modified to other document layouts. In some embodiments, the set of transformation rules based on a classification of whether the document element is a foreground element or a background element. In other instances, the set of transformation rules are selected based on both the aspect-ratio difference exceeding a predefined threshold and based on whether the document element is classified as a background element or a foreground element. Additionally and alternatively, the set of transformation rules differ based on a magnitude of difference between aspect ratios exceeding a threshold. Based on identifying the transformation rules based on such classification, the layout-modification application can effectively determine that parts of document element that can be cropped, or that the document element should be relocated in order to prevent distortion or unintentional loss of content. Therefore, document with the modified layouts could be automatically processed to selectively convey content that preserves meaningful information. Accordingly, embodiments herein reflect an improvement in functions of content-processing system and content-editing technology.

Computing Environment

FIG. 1 illustrates a computing environment 100 for transforming document elements for modified document layouts in accordance with some embodiments. The computing systems in this example include a server system 102 and computing systems 103a and 103b in communication via a network 106.

The server system 102 includes a processor 104 that is communicatively coupled to a memory 108 and that executes computer-executable program instructions and/or accesses information stored in the memory 108. In some embodiments, the processor 104 includes a microprocessor, an application-specific integrated circuit ("ASIC"), a state machine, or other suitable processing device. In some instances, the processor 104 includes any of a number of computer processing devices, including one. Such a processor can include or communicate with a computer-readable medium storing instructions that, when executed by the processor 104, cause the processor to perform the steps described herein.

In some embodiments, the server system 102 provides access to documents 114. The documents 114 could be stored in any suitable computer-readable medium and execute on any suitable processor. In some embodiments, the documents 114 are stored in the memory 108 at the server system 102. In some instances, the documents 114 are accessed by the server system 102 from a remote location via a network 106 and provided to computing systems 103a and 103b. Each document of the documents 114 could be associated with a document layout structured in a particular aspect ratio. In some instances, each document of the documents 114 includes a set of document elements 115 and are transmitted by the server system 102 to the computing systems 103a and 103b. In some embodiments, the documents 114 are generated by the server system 102 or by another system (e.g., application servers).

As referred above, each document of the documents 114 could be associated with a document layout. The document layout is referred as an arrangement of document elements (e.g., text, images, pixel patterns, and other types of content) depicted on a page. Document layouts likely affect appearance and structure of the document, such that document information is conveyed to users. In some instances, the document layout identifies positions of document elements of the document as specified by their respective coordinates of a grid representing the document layout. In some embodiments, the document layout is also structured in a particular aspect ratio. The aspect ratio refers to a ratio of a width of a given document (e.g., a document of the documents 114) to its height. For example, the aspect ratio is expressed as two numbers separated by a colon, as in 16:9.

In some embodiments, a layout-modification application 116 stored in the memory 108 configures the processor 104 to process documents 114. For example, the layout-modification application 116 configures the processor 104 to access some or all of the documents 114 stored in the memory 108 or any other suitable computer-readable medium. In some instances, the layout-modification application 116 provides a social media service, a cloud service, or other network service providing access to the documents 114. For example, the cloud service includes a collection of computing resources, including computing systems and/or applications, that are provided as an online service via a data network. In some instances, the collection of computing systems and/or hardware is represented as a single service. The cloud service can provide a digital hub for browsing, creating, sharing, and otherwise using electronic content using one or more applications provided via the cloud service.

The layout-modification application 116 accesses a document of the documents 114 that has a first document layout, in which the first document layout defines an initial aspect ratio of the document. The layout-modification application 116 identifies a first set of measurements of each document element of the document elements 115 and a first location of each document element within the document. The layout-modification application receives an indication to modify the document from having the initial aspect ratio to having a target aspect ratio. The layout-modification application 116 determines an aspect-ratio difference between the initial aspect ratio and the target aspect ratio. The layout-modification application 116 selects a set of transformation rules that specify, for each document element, a second set of measurements and a second location. To select the particular set of transformation rules, the layout-modification application 116 uses the determined aspect-ratio difference. In some instances, the layout-modification application 116 compares the determined aspect-ratio difference against a predefined threshold to select a particular set of transformation rules over another set of transformation rules.

The layout-modification application 116 applies the selected set of transformation rules to each document element. The layout-modification application 116 generates transformed document elements that include the second set of measurements, in which the transformed document elements are configured to be located at the second locations. In some instances, the layout-modification application 116 transforms the document elements in proportion to an extent of an aspect-ratio modification that occurred between the initial document layout and the modified document layout. The layout-modification application 116 modifies the document to have the target aspect ratio defined by a second document layout, in which the second document layout specifies that the transformed document elements represent the document elements at the second locations of the modified document.

In some embodiments, the server system 102 also includes a number of external or internal devices such as input or output devices. For example, the server system 102 is shown with an input/output ("I/O") interface 112. In some instances, a bus 110 is also be included in the server system 102, which communicatively couples one or more components of the server system 102.

FIG. 1 also illustrates the layout-modification application 116 included in the memory 108 of the server system 102. In some embodiments, the layout-modification application 116 includes one or more modules. In some instances, The layout-modification application 116 configures the server system 102 to access, modify, transmit, or otherwise use the documents 114 in response to input provided by the client applications 128a and/or 128b. For example, the client application 128a transmits a query to retrieve a document of the documents 114, at which the server system 102 accesses the document by processing the query through a database system.

In some embodiments, the layout-modification application 116 also configures the server system 102 to allow multiple computing systems 103a and/or 103b or other client systems to access or otherwise use some or all of the documents 114. In some embodiments, the layout-modification application 116 stores data in the memory 108 identifying client accounts via which the client applications 128a and/or 128b access the layout-modification application 116. In other embodiments, the layout-modification application 116 accesses data from a remote data source that identifies client accounts via which the client applications 128a and/or 128b access the layout-modification application 116. In some instances, the layout-modification application 116 stores data describing associations between client accounts and items of the documents 114.

In some instances, the server system 102 includes any suitable computing system for hosting the layout-modification application 116. In one embodiment, the server system 102 is a single computing system. In another embodiment, the server system 102 is a virtual server implemented using a number of computing systems connected in a grid or cloud computing topology.

Each of the computing systems 103a and/or 103b includes a computer-readable medium such as processors 118a and/or 118b, respectively. Each of the processors 118a and/or 118b is communicatively coupled to a memory 120a and/or 120b, respectively. Each of the processors 118a and/or 118b respectively executes computer-executable program instructions and/or accesses information stored in the memory 120a and/or 120b. In some embodiments, each of the processors 118a and/or 118b includes a microprocessor, an ASIC, a state machine, or other processor. In some instances, each of the processors 118a and/or 118b includes any of a number of computer processing devices, including one. Such a processor can include or communicate with a computer-readable medium. The computer-readable medium stores instructions that when executed by the processor, cause the processor to perform the steps described herein.

In some instances, the computing systems 103a and/or 103b also include a number of external or internal devices such as a mouse, a CD-ROM, DVD, a keyboard, a display, audio speakers, one or more microphones, or any other input or output devices. For example, each of the computing systems 103a and/or 103b is respectively shown with input/output ("I/O") interfaces 124a, 124b and display devices 126a, 126b. In some instances, buses 122a, 122b are respectively included in the computing systems 103a and/or 103b, and each of the buses 122a, 122b communicatively couples one or more components of the computing systems 103a and/or 103b.

FIG. 1 also illustrates the client applications 128a and/or 128b respectively included in the memory 120a and/or 120b of the computing systems 103a and/or 103b. In some embodiments, each of the client applications 128a and/or 128b includes one or more software modules. In some instances, the client applications 128a and/or 128b respectively configure the processors 118a and/or 118b to modify or otherwise access the documents 114 provided by the server system 102 via the network 106. In other instances, the client applications 128a and/or 128b respectively configure the processors 118a and/or 118b to respectively display the document with the modified document layout. For example, each of the client applications 128a and/or 128b is an internet browser application, a social media application, and the like. In some instances, a network session for accessing or otherwise modifying the documents 114 is established by the client applications 128a and/or 128b via the network 106 between computing systems 103a and/or 103b and the server system 102.

Figure 2:
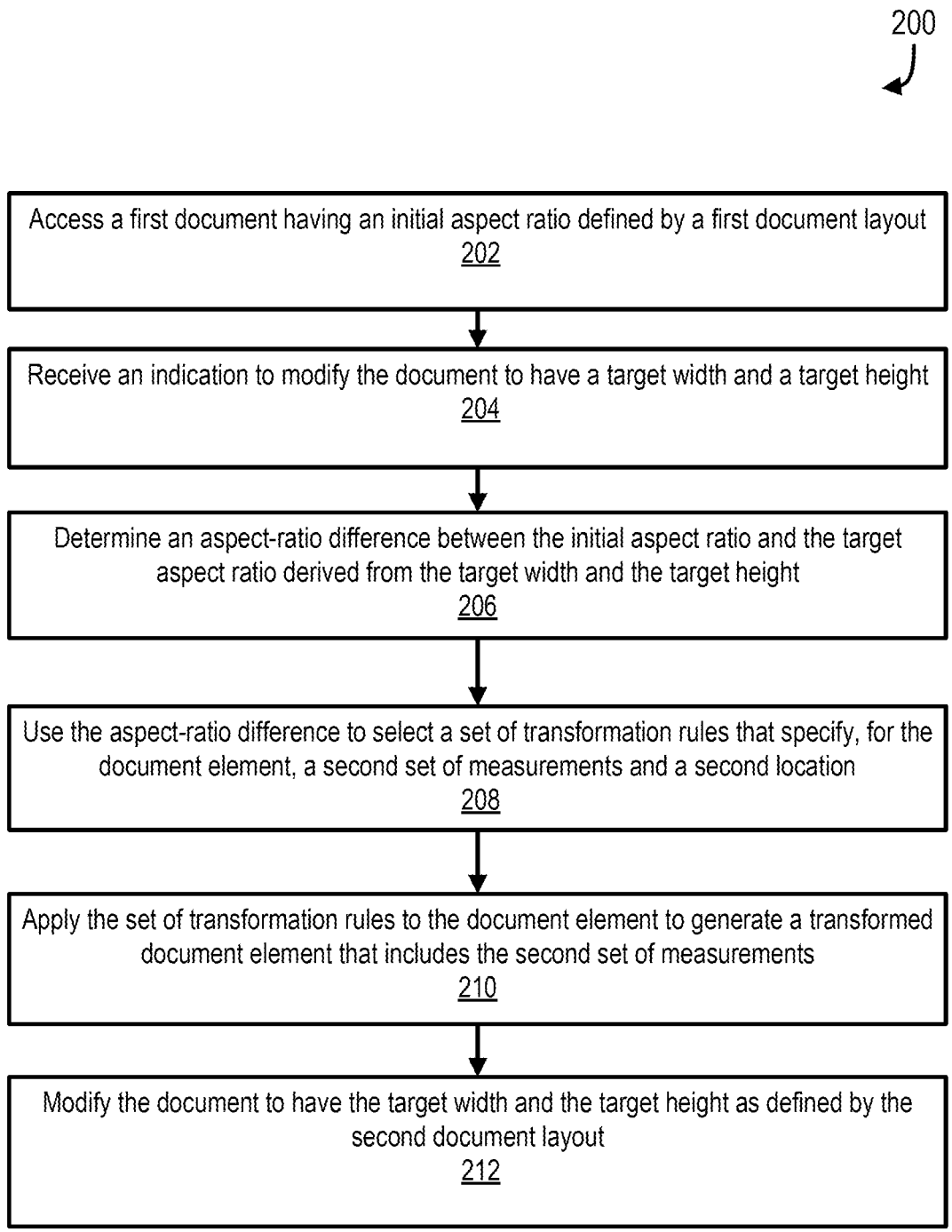
FIG. 2 illustrates a process for transforming document elements for modified document layouts in accordance with some embodiments.

Overall Process for Transforming Document Elements for Modified Document Layouts FIG. 2 illustrates a process 200 for transforming document elements for modified document layouts in accordance with some embodiments. For illustrative purposes, the process 200 is described with reference to the components illustrated in FIG. 1, though other implementations are possible. For example, the program code for layout-modification application 116 of FIG. 1, which is stored in a non-transitory computer-readable medium, is executed by one or more processing devices to cause the server system 102 to perform one or more operations described herein.

At step 202, the layout-modification application accesses a document having an initial aspect ratio defined by a first document layout. In some embodiments, the document includes a set of document elements, each of which is classified as a background or foreground element. As mentioned above, the document can be a single-page or single-canvas document comprising images and/or text. In some instances, a document element of the set of document elements represents an image, text, a pixel pattern, a user-interface element, other types of content, or combinations thereof. Depending on the classification, a different set of transformation rules is applied to modify the document element without document distortion or other loss of content (e.g., image content, text, user-interface elements). In some instances, the first document layout is characterized with a numerical array of values that identify its location and size.

In some embodiments, one or more operations in process 200, such as operations used to implement one or more of steps 204-212, can implement a step for modifying the document to have a target aspect ratio defined by a target width and a target height, in which document elements of the initial document are transformed based on a difference between an initial aspect ratio of the first document layout and the target aspect ratio. In some instances, the layout-modification application identifies, for the first document, a first set of measurements of a document element and a first location of the document element within the first document. In some embodiments, the layout-modification application generates a bounding region surrounding the document element, in which the first set of measurements correspond to the generated bounding region. For example, the layout-modification application 116 measures a bounding region, which corresponds to a foreground element, and determines that the bounding region includes a width value of 117 pixels and a height value of 36 pixels.

At step 204, the layout-modification application receives an indication to modify the document such that the modified document has a target width and a target height. For example, the indication is received via one or more user actions on a client user interface. In another example, the layout-modification application detects a user input such as dragging the document to a target aspect ratio derived from the target width and the target height. At step 206, the layout-modification application determines an aspect-ratio difference between the initial aspect ratio and the target aspect ratio derived from the target width and the target height. The aspect-ratio difference indicates a magnitude of difference between the initial aspect ratio and the target aspect ratio. In some instances, the layout-modification application determines the aspect-ratio difference by a subtracting a lesser aspect ratio value (e.g., an initial aspect ratio value of 1) from a greater aspect ratio value (e.g., a target aspect ratio value of 1.78). In some embodiments, the layout-modification application uses the magnitude of the aspect-ratio difference to select and apply different sets of transformation rules on the document elements to potentially reduce document distortion and loss of content.

At step 208, the layout-modification application uses the aspect-ratio difference to select a set of transformation rules that specify, for the document element, a second set of measurements and a second location. For example, the set of transformation rules include performing a scaling operation, a cropping operation, a reflection operation, and a move operation. In some instances, a transformation rule specifies a subset of the above operations such that the document element is transformed to fit within a modified document having the target aspect ratio. For example, a set of transformation rules specify cropping to be performed, but without scaling, such that the content of the document element is not distorted. In other instances, the set of transformation rules specify generating an intermediate document layout for rearranging the document elements into new vertical positions.

At step 210, the layout-modification application applies the set of transformation rules to the document element to generate a transformed document element that includes the second set of measurements. In some embodiments, the second set of measurements include different height or width values as compared the first set of measurements. In some instances, the second set of measurements are proportional to an extent of change from the initial aspect ratio of the initial document layout and the target aspect ratio. In some instances, the second set of measurements are determined by applying width-ratio and height-ratio values between the initial width and height values of the initial document layout and the target width and height values (as specified in step 204) to generate the transformed document element. For example, the layout-modification application identifies the second location by applying the width-ratio and height-ratio values between the two aspect ratios to determine an x-axis and y-axis values of the transformed document element.

At step 212, the layout-modification application modifies the document to have the target width and height as defined by a second document layout. The second document layout is associated with the target aspect ratio that corresponds to the target width and height and specifies that the transformed document element should be located at the second location of modified document. The process 200 terminates thereafter.

Classifying Document Elements

Figure 3:
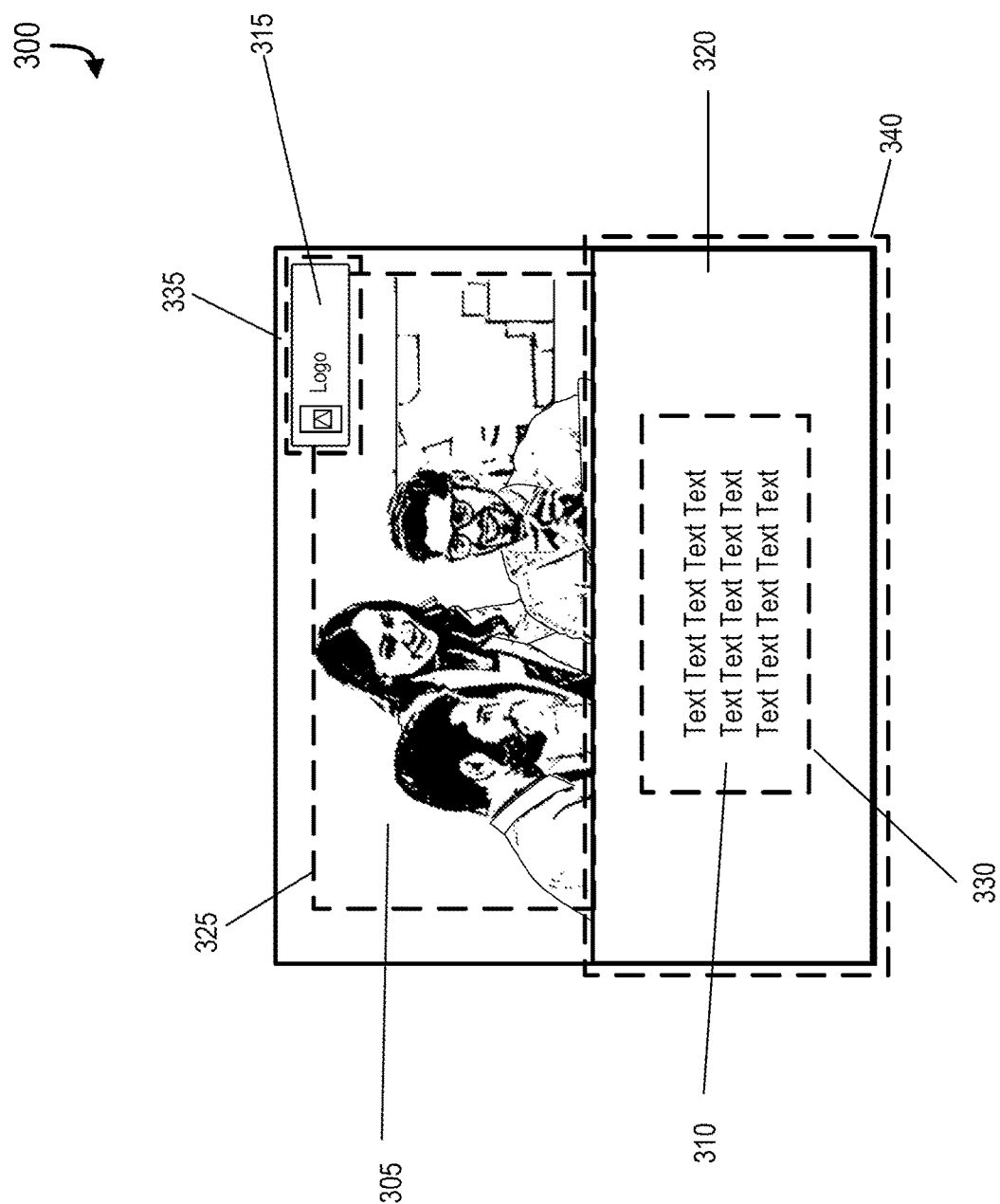
FIG. 3 shows an example of a document with classified document elements in accordance with some embodiments.

FIG. 3 shows an example of a document 300 with classified document elements in accordance with some embodiments. The document 300 is a single-page document which includes a set of document elements 305-320. In addition, the document 300 is associated with an initial document layout having a particular size. For example, the document 300 includes the initial document layout having width value of 300 pixels and a height value of 250 pixels. Each of the set of document elements 305-210 is surrounded by one of bounding regions 325-340. For example, a bounding region 325 surrounds a document element 305, a bounding region 330 surrounds a document element 310, a bounding region 335 surrounds a document element 315, and a bounding region 340 surrounds a document element 320. The elements shown in FIG. 3 will be further described in light of the context of an element-classification process illustrated in FIG. 4.

Figure 4:
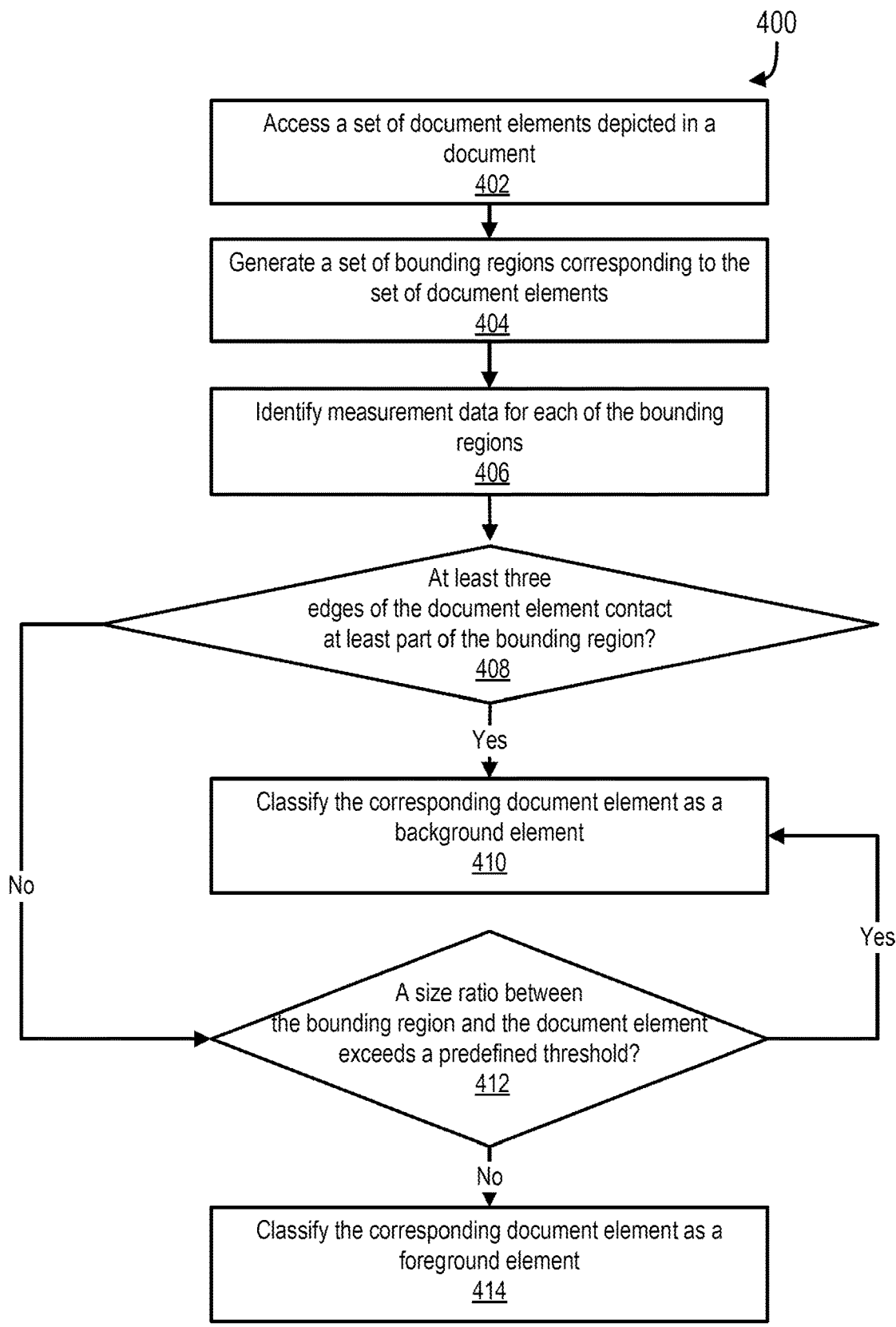
FIG. 4 illustrates a process for classifying document elements for modified document layouts in accordance with some embodiments.

FIG. 4 illustrates a process 400 for classifying document elements for modified document layouts in accordance with some embodiments. For illustrative purposes, the process 400 is described with reference to the components illustrated in FIG. 1, though other implementations are possible. For example, the program code for layout-modification application 116 of FIG. 1, which is stored in a non-transitory computer-readable medium, is executed by one or more processing devices to cause the server system 102 to perform one or more operations described herein.

At step 402, a layout-modification application accesses the set of document elements 305-320 depicted in the document 300. In some embodiments, the layout-modification application detects the set of document elements 305-320 from the document 300. In some instances, the layout-modification application uses an element-detection model to detect the presence and location of multiple classes of document elements in the document 300. For example, the element-detection model is trained with training documents that contain various training content data, in which the training content data includes a label that specifies a class of the training content data (e.g. a foreground logo, a headline, or a background fill) and/or data specifying where the training data appears in the training document. In some instances, the layout-modification application 116 uses the trained element-detection model to identify and output the detected document elements, including a location of a bounding region that contains each of the detected document elements. In some instances, the element-detection model outputs a confidence score with respect to the accuracy of the detection.

At step 404, the layout-modification application generates the bounding regions 325-340 that surround, or otherwise correspond to, the set of document elements 305-320. In some instances, the bounding region includes a polygonal box surrounding the document element, overlapping with the document element, or otherwise associated to the document element in the document 300 to define a set of pixels that are associated with a location of the document element in the document 300. For example, a bounding region 325 depicts a rectangular border around the document element 305, which allows the document element 305 within the bounding region 325 to be moved, transformed, reflected, or scaled. In some instances, the layout-modification application applies a neural network model (e.g., a deep-convolutional neural network model) to the document 300 to generate the bounding regions 325-340, in which the neural network model is trained through a randomized set of bounding regions generated for each training document. Additionally or alternatively, the layout-modification application generates the bounding regions 325-340 by randomly generating an initial set of bounding regions for the set of document elements 305-320, and applying another neural network model to the initial set of bounding regions to scale a size of each bounding region to fit around the respective document element.

At step 406, the layout-modification application identifies measurement data for each of the bounding regions 325-340. In some instances, the measurement data includes size (e.g., height and width) as well as a position for a bounding region (e.g., the bounding region 325) in the document 300. In some instances, the measurement data is characterized with an array of numerical values (x, y, width, height) to define the size and location of the bounding region within the document 300. For example, "x" refers to the x-coordinate of the bounding region 325 at the upper-left corner, "y" refers to the y-coordinate of the bounding region 325 at the upper-left corner, "width" is the width of the bounding region 325, and "height" is the height of the bounding region 325.

In some embodiments, the measurement data is represented as metadata for the bounding region, such as a JSON format. By modifying the metadata, the layout-modification application can generate new bounding regions for the set of document elements 305-320, such that the set of document elements 305-320 are modified to fit within the new dimensions of the modified document layout.

The layout-modification application then determines whether a corresponding document element for the bounding region is a background element or a foreground element. By classifying the document elements as background elements or foreground elements, the layout-modification application could apply different transformation rules due to the differing characteristics of document elements that belong under these two categories.

At step 408, the layout-modification application determines, for each bounding region of bounding regions 325-340, whether at least three edges of the document 300 contact at least part of the bounding region. For example, a bounding region 340 of the document element 320 is depicted to contact a left, bottom, and right edges of the document 300. If at least three edges of the document 300 contact the bounding region, the layout-modification application classifies the corresponding document element as a background element (step 410). Referring to the above example, the document element 320 is classified as a background element. Conversely, if fewer than three edges of the document 300 contact the bounding region, the layout-modification application proceeds with step 412 to perform an additional determination whether the document element should be classified as the background element or the foreground element.

At step 412, the layout-modification application determines whether an area ratio between an area of the bounding region and an area of the document 300 exceeds a predefined threshold. In some implementations, the layout-modification application determines an area (e.g., width*height) corresponding the bounding region and compares the determined area with a total area of the document 300 to calculated the area ratio. For example, a bounding region 325 of the document element 305 does not appear contact any edges of the document 300, but its calculated area is approximately between 40% and 50% of a total area of the document 300. In some instances, layout-modification application determines the predefined threshold by calculating a percentage value of a total area of the document. In some instances, the predefined threshold is a value selected from a range between 30% and 40% of the total area of the document. If the area ratio exceeds the predefined threshold, the layout-modification application classifies the corresponding document element as a background element (step 410). Referring to the above example, the area ratio between the bounding region 325 and the document 300 exceeds the predefined threshold of 30%. Thus, the layout-modification application classifies the document element 305 as the background element. Conversely, if the area ratio is less than the predefined threshold, the layout-modification application classifies the corresponding document element as a foreground element (step 414). Process 400 terminates thereafter.

Determining Aspect-Ratio Difference Between Document Layouts

Figure 5:
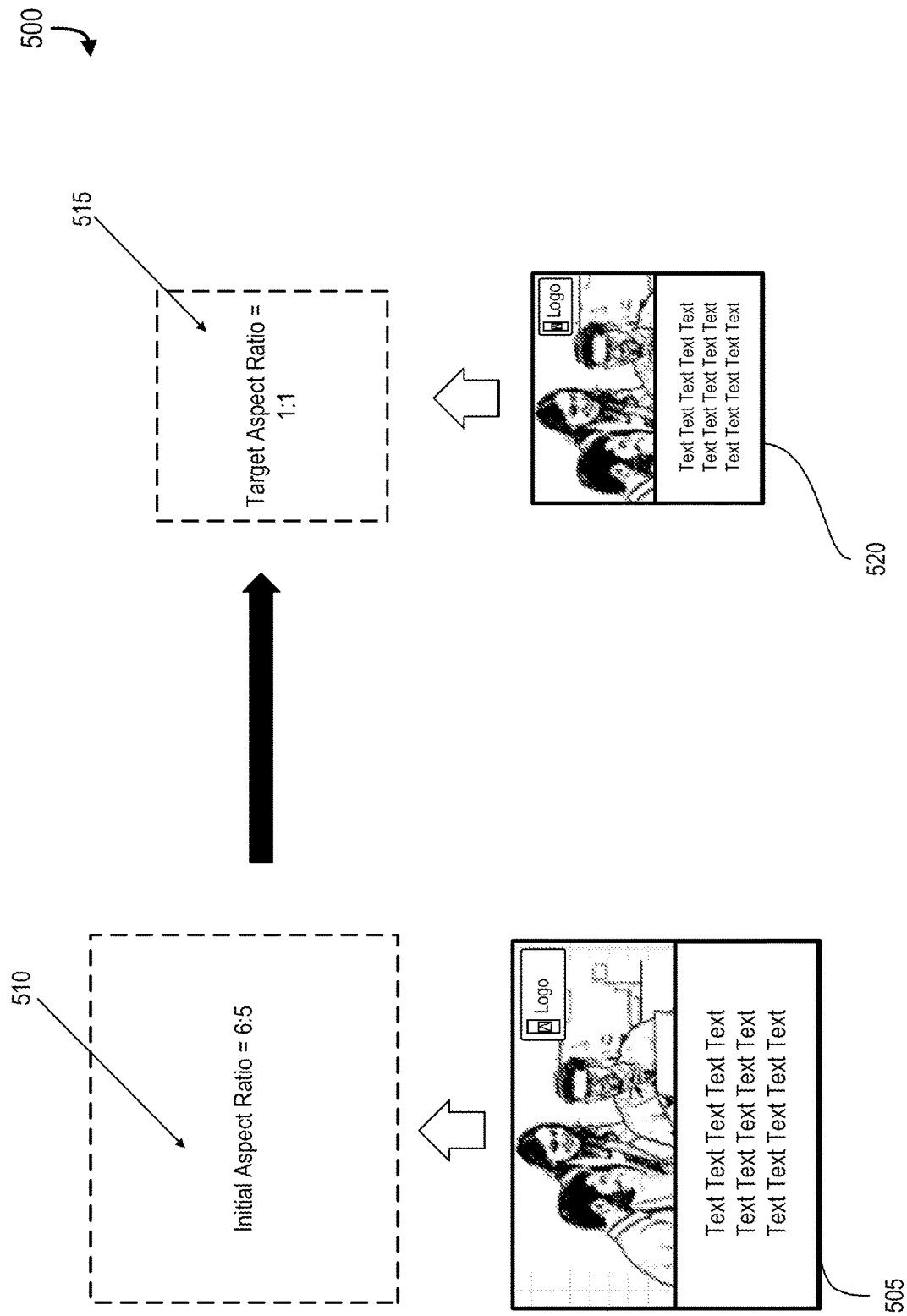
FIG. 5 illustrates a diagram that converts an initial document layout of a document to a modified document layout in accordance with some embodiments.

FIG. 5 illustrates a diagram 500 that depicts modifying a document 505 having an initial aspect ratio 510 to a document 520 with target aspect ratio 515 in accordance with some embodiments. As described above, the target aspect ratio 515 is defined by a target width and target height that was specified by a user device for transforming the document 505 to the document 520. An initial document layout of the document 505 is associated with an initial aspect ratio and includes document elements such an image of office, a log, and text. The initial aspect ratio 510 includes a width of 300 pixels and height of 250 pixels. As a result, the initial aspect ratio 510 of the document 505 is 6:5.

The layout-modification application receives an indication to modify the document 505 such that the modified document 520 is defined by a target width and a target height. For example, the indication is received via one or more user actions on a client user interface of a client system (e.g., the computing systems 103a of FIG. 1). For example, the one or more actions include dragging the document to have a different width and height.

The target aspect ratio 515 is characterized with a different width and height ratio compared to the initial aspect ratio 510. For example, width of the target aspect ratio 515 is 200 pixels, and height of the target aspect ratio 515 is 200 pixels. As a result, the target aspect ratio 515 is 1:1. In this example, the modified document 520 having the target aspect ratio 515 is considered to have a square-shaped layout.

The layout-modification application determines an aspect-ratio difference between the initial aspect ratio 510 and the target aspect ratio 515. For example, the aspect-ratio difference between the two aspect ratios is 0.2, which is calculated between the initial aspect ratio (e.g., 6:5=1.2) and the target aspect ratio (e.g., 1:1=1). In some instances, the layout-modification application determines the aspect-ratio difference by a subtracting a lesser aspect ratio value from a greater aspect ratio value. Referring to the above example, the layout-modification selects the target aspect ratio (1) and subtracts it from the initial aspect ratio (1.2), because the initial aspect ratio has the greater value. The layout-modification application uses a value indicated by the aspect-ratio difference as input to select a set of transformation rules that specify a second set of measurements and a second location for each document element of the document 505. In some instances, the set of transformation rules are selected by comparing the aspect-ratio difference with a predefined threshold. Referring to the above example, the layout-modification application selects the set of transformation rules indicating that the document element should simply be resized if the aspect-ratio difference (e.g., 0.2) is less than the predefined threshold (e.g., 0.7). In some instances, a same value of the predefined threshold is applied against the aspect-ratio difference, regardless of the classification of the document element (e.g., the background element, the foreground element).

Transforming Background Elements for Modified Document Layouts

As described above, the layout-modification application applies the set of transformation rules to the document element. For example, the set of transformation rules include resizing, reflection, or repositioning operations that are applied to transform the document element. In some instances, the layout-modification application selects a different set of transformation rules in response to determining that the document element is classified as a background element.

Figure 6:
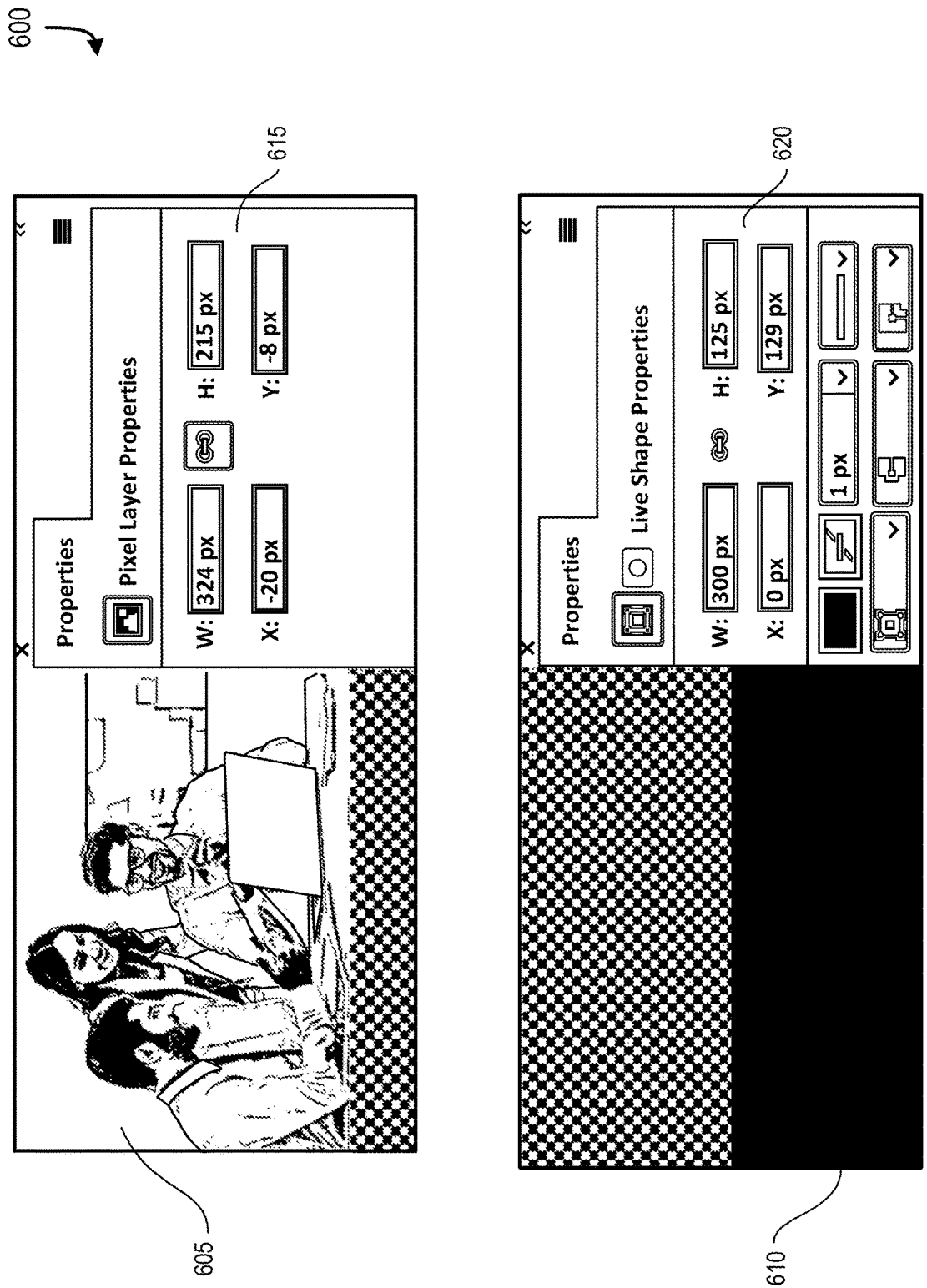
FIG. 6 shows a set of document elements that are classified as background elements in accordance with some embodiments.

FIG. 6 shows a set of document elements 600 that are classified as background elements in accordance with some embodiments. The set of document elements 600 include a background element 605, which depicts an image of people. The background element 605 includes a set of location coordinates (−20, −8), having width of 324 pixels and height of 215 pixels. In some embodiments, the set of location coordinates corresponds to an upper-left corner of a bounding region generated for the background element 605, and the layout-modification application 116 selects, as the size dimensions, a size of the generated bounding region. In some instances, the measurement data corresponding to the background element 605 are structured as an array of values 615, such as (−20, −8, 324, 215).

The set of document elements 600 also include a background element 610, which depicts a filled rectangle with black color. The background element 610 includes a set of location coordinates (0, 129), having width of 300 pixels and height of 125 pixels. Similar to above, the set of location coordinates corresponds to an upper-left corner of a bounding region generated for the background element 610, and the layout-modification application 116 selects, as the size dimensions, a size of the generated bounding region. In addition, the measurement data corresponding to the background element 610 can be structured as an array of values 620, such as (0, 129, 300, 125). As depicted by the respective measurement data, the background element 605 and the background element 610 partly overlap each other, in which one of the background elements obscure the overlapping region of the other background element. The overlapping region can be maintained as the document is modified with the target aspect ratio, since the layout-modification application transforms the bounding boxes while keeping the relative positions among background elements.

In some embodiments, the layout-modification application accesses each of the background elements 605 and 610 to generate a transformed document element that includes the modified measurement data, having a different location and size-dimension values. As described above, the modified measurement data include different width or height values as compared the initial measurement data of the background elements 605 and 610. In some instances, the modified measurement data is proportional to the aspect-ratio difference between an initial (e.g., the initial aspect ratio 510 of FIG. 5) and a target aspect ratio (e.g., the target aspect ratio 515 of FIG. 5).

Figure 7:
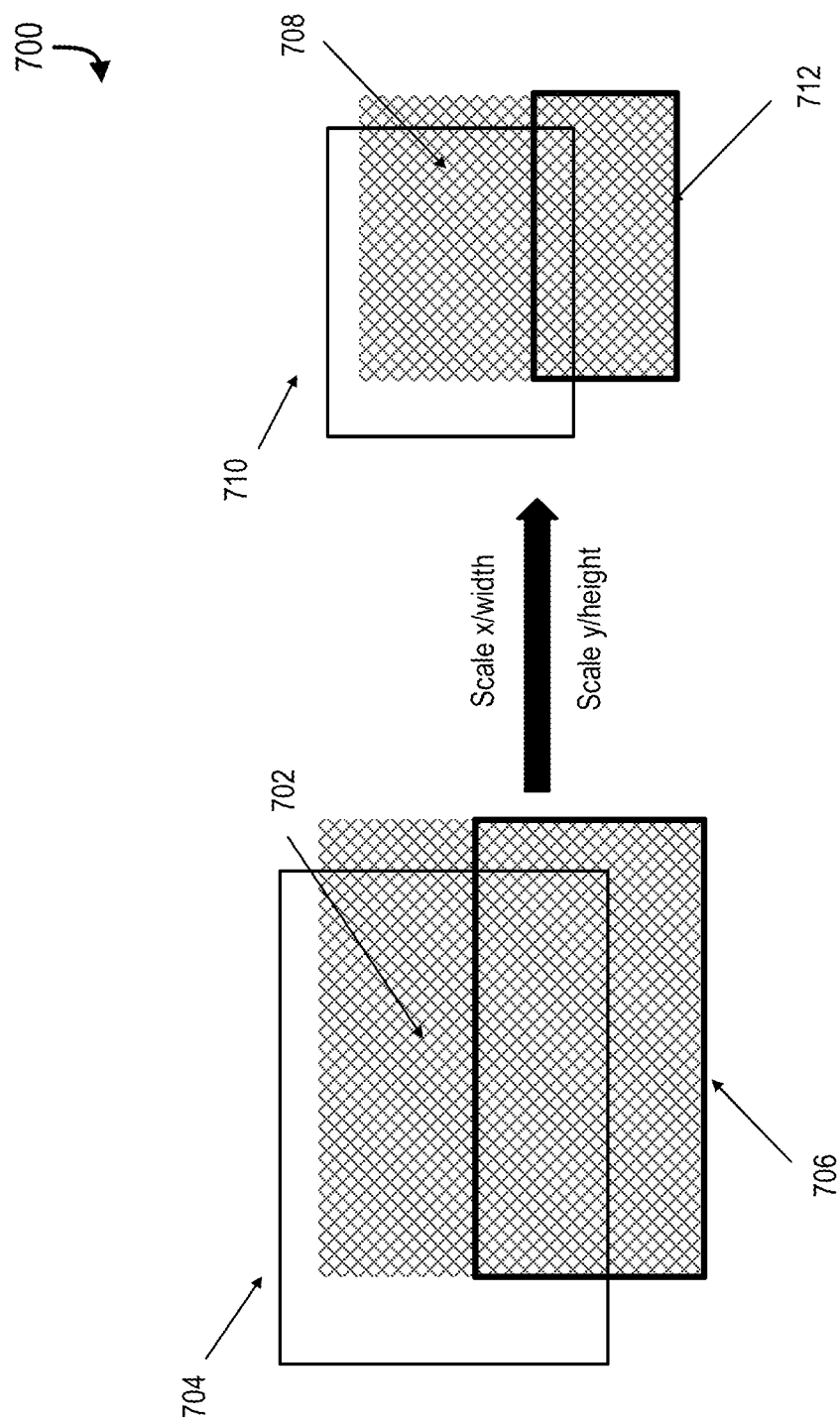
FIG. 7 shows a schematic diagram for transforming background elements in response to aspect-ratio difference being less than a threshold, in accordance with some embodiments.

(a) Scaling of the Bounding Regions for the Modified Document Layout with Aspect-Ratio Difference Lower than a Threshold FIG. 7 shows a schematic diagram 700 for transforming background elements in response to aspect-ratio difference being less than a threshold, in accordance with some embodiments. The schematic diagram 700 includes a document (e.g., the document 300 of FIG. 3). The document is associated with an initial document layout 702, which identifies an arrangement of document elements within the document. For example, the initial document layout 702 is associated with an initial aspect ratio having a width value of 300 pixels and a height value of 250 pixels. In some instances, the initial document layout 702 is characterized with a numerical array (0, 0, 300, 250) that identifies the location and size of the initial document layout 702. The initial document layout 702 identifies an initial bounding region 704 for a first background element. In some instances, the background element depicts another document (e.g., an image of an office). The initial bounding region 704 is located at an x-axis value of −50 and a y-axis value of −20, relative to the position of the document. The initial bounding region 704 also includes a width value of 324 pixels and a height value of 215 pixels. As such, the initial bounding region 704 is characterized with a numerical array (−50, −20, 324, 215) that identifies the location and size of the initial bounding region 704.

In addition, the initial document layout 702 identifies another initial bounding region 706 for a second background element. In some instances, the second background element depicts a pixel pattern (e.g., a fill pattern, a gradient pattern). The initial bounding region 706 is located at an x-axis value of 0 and a y-axis value of 150, relative to the position of the document. The initial bounding region 706 also includes a width value of 300 pixels and a height value of 125 pixels. As such, the initial bounding region 706 is characterized with a numerical array (0, 150, 300, 125) that identifies the location and size of the initial bounding region 706.

The schematic diagram 700 also includes an output document having a modified document layout 708. For example, the modified document layout 708 is associated with a target width value of 200 pixels and a target height value of 200 pixels. In some instances, the modified document layout 708 is characterized with a numerical array (0, 0, 200, 200) that identifies the location and size of the modified document layout 708. The modified document layout 708 identifies a transformed bounding region 710 for the first background element. The transformed bounding region 710 corresponds to the initial bounding region 704 transformed in proportion to the modified document layout 708. For example, the transformed bounding region 710 is located at an x-axis value of −13 and a y-axis value of −6, relative to the position of the output document. The transformed bounding region 710 also includes a width value of 216 pixels and a height value of 172 pixels. As such, the transformed bounding region 710 is characterized with a numerical array (−33, −16, 216, 172) that identifies the location and size of the transformed bounding region 710.

Similarly, the initial document layout 702 identifies another transformed bounding region 712 for the second background element. The transformed bounding region 712 corresponds to the initial bounding region 706 transformed in proportion to the modified document layout 708. For example, the transformed bounding region 712 is located at an x-axis value of 0 and a y-axis value of 120, relative to the position of the output document. The transformed bounding region 712 also includes a width value of 200 pixels and a height value of 100 pixels. As such, the transformed bounding region 712 is characterized with a numerical array (0, 120, 200, 100) that identifies the location and size of the transformed bounding region 712.

Figure 8:
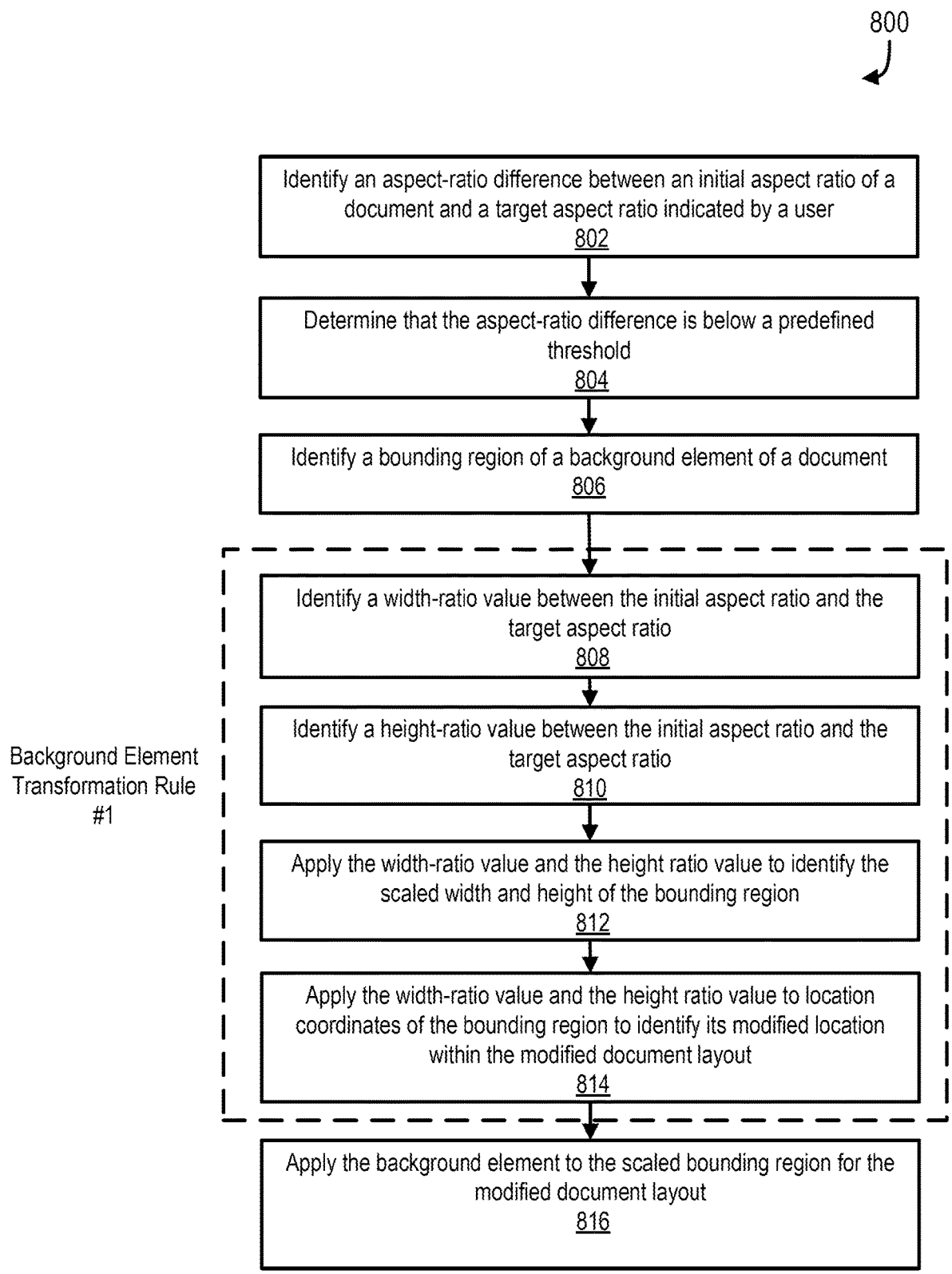
FIG. 8 illustrates a process for transforming background elements in response to aspect-ratio difference being less than a threshold, in accordance with some embodiments.

FIG. 8 illustrates a process 800 for transforming background elements in response to aspect-ratio difference being less than a threshold, in accordance with some embodiments. For illustrative purposes, the process 800 is described with reference to the components illustrated in FIG. 1, though other implementations are possible. For example, the program code for layout-modification application 116 of FIG. 1, which is stored in a non-transitory computer-readable medium, is executed by one or more processing devices to cause the server system 102 to perform one or more operations described herein.

At step 802, the layout-modification application identifies an aspect-ratio difference between an initial aspect ratio of a document and a target aspect ratio indicated by a user device. For example, the aspect-ratio difference between the initial aspect ratio (e.g., 350:250=1.4) and the target aspect ratio (e.g., 200:200=1) is 0.4.

At step 804, the layout-modification application determines that the aspect-ratio difference is less than a predefined threshold. Continuing with the above example, the predefined threshold is 1.9. The layout-modification application uses the predefined threshold (1.9) as an input to determine that the aspect-ratio difference between the two aspect ratios (e.g., 0.4) is below the predefined threshold. As explained above, the layout-modification application determines the aspect-ratio difference by a subtracting a lesser aspect ratio value from a greater aspect ratio value. Referring to this example, the layout-modification selects the target aspect ratio (1) and subtracts it from the initial aspect ratio (1.4), because the initial aspect ratio has the greater value.

In some instances, a different threshold is selected in response to the layout-modification application determining a type of layout-modification of the document. For example, the layout-modification application determines that the aspect-ratio difference between the initial aspect ratio and the target aspect ratio corresponds to a square-to-landscape modification type and selects 1.9 as the predefined threshold. As referred herein, the square-to-landscape modification type is a modification of a document having an equal height and width ("square") to a target document having a target height value that is less than a target width value ("land-scape"). In another example, the layout-modification application determines that aspect-ratio difference between the initial aspect ratio and the target aspect ratio corresponds to a square-to-portrait modification type and selects 0.7 as the predefined threshold. As referred herein, the square-to-portrait modification type is a modification of a document having an equal height and width ("square") to a target document having a target height value that is greater than a target width value ("portrait"). While the above examples describes the two types of layout modifications, it will be appreciated by one skilled in the art that other types of layout modifications (e.g., landscape-to-square) can result in selection of different threshold values.

At step 806, the layout-modification application identifies a bounding region of a background element of a document. In some instances, the initial bounding region is characterized with a numerical array (−50, −20, 324, 215), in which a first sub-array (−50, −20) identifies a set of coordinates of the location of the initial bounding region and a second sub-array (324, 215) identifies the width and height pixel values of the initial bounding region.

At step 808, the layout-modification application identifies a width-ratio value between the initial document width and a target width (e.g., the target width identified in step 204 of FIG. 2). For example, the width-ratio value is calculated by the target width divided by the width value of the initial document layout:

width_ratio_value=target_width/initial_width

Continuing with the example, the width-ratio value between the width of the initial document layout (e.g., 300 pixels) and the target width (e.g., 200 pixels) is 0.667.

At step 810, the layout-modification application identifies a height-ratio value between the initial document height and a target height (e.g., the target height identified in step 204 of FIG. 2). For example, the height-ratio value is calculated by a target height divided by the height value of the initial document layout:

height_ratio_value=target_height/initial_height

Continuing with the example, the height-ratio value between the height of the initial document layout (e.g., 250 pixels) and the target height (e.g., 200 pixels) is 0.8.

At step 812, the layout-modification application applies the width-ratio value and the height ratio value to identify the scaled width and height of the identified bounding region. For example, the width transformed_element_width and height transformed_element_height of the scaled bounding region are identified using the following expression:

transformed_element_width=initial_element_width* width_ratio_value transformed_element_height=initial_element_height* height_ratio_value Continuing with the example, the width value for the transformed bounding region is 216 pixels, which is calculated by multiplying the width of the initial bounding region (e.g., 324 pixels) with the calculated width-ratio value (e.g., 0.667). In addition, the height value for the transformed bounding region is 172 pixels, which is calculated by multiplying the height of the initial bounding region (e.g., 215 pixels) with the calculated height-ratio value (e.g., 0.8).

At step 814, the layout-modification application applies the width-ratio value and the height ratio value to location coordinates of the bounding region to identify its modified location within the modified document layout. For example, the location of the bounding region, represented with coordinates (transformed_element_x, transformed_element_y), is identified using the following expression:

transformed_element_$x$=initial_element_$x$*width_ratio_value transformed_element_$y$=initial_element_$y$*height_ratio_value For example, the x-axis value for the transformed bounding region is −33, which is calculated by multiplying the x-axis value of the initial bounding region (e.g., −50) with the calculated width-ratio value (e.g., 0.667). In addition, the y-axis value for the transformed bounding region 710 is −16, which is calculated by multiplying the y-axis value of the initial bounding region 704 (e.g., −20) with the calculated height-ratio value (e.g., 0.8).

At step 816, the layout-modification application applies the background element to the scaled bounding region in the modified document layout. The scaled bounding region includes the background element or a portion of the background element. Continuing with the example, the transformed bounding region is characterized with a numerical array (−33, −16, 216, 172), to which the background element is applied. As such, the background element is modified in proportion to the size and location identified for the transformed bounding region. In some instances, the background element is modified through various types of transformation rules (e.g., crop), which are further described in FIG. 11 herein below. In some embodiments, steps 806 to 816 for other background elements, thereby generating a set of background elements that are applied to their respective transformed bounding regions for the modified document layout. For example, steps 806 to 816 are performed on the initial bounding region 706 to generate the transformed bounding region 712. Process 800 terminates thereafter.

Figure 9:
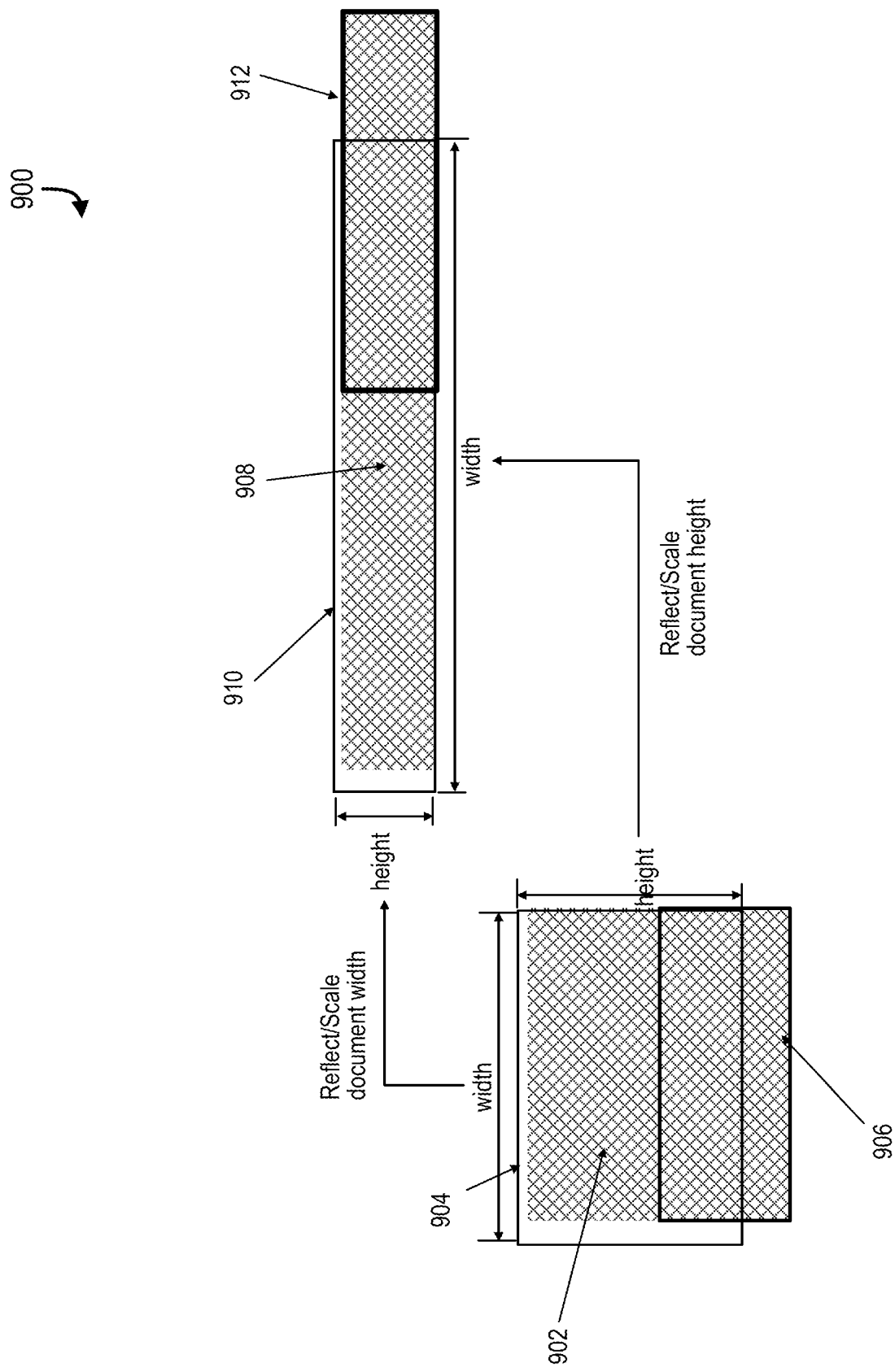
FIG. 9 shows a schematic diagram for transforming background elements in response to aspect-ratio difference exceeding a threshold, in accordance with some embodiments.

(b) Scaling and Reflection of the Bounding Regions for the Modified Document Layout with Aspect-Ratio Difference Exceeding a Threshold FIG. 9 shows a schematic diagram 900 for transforming background elements in response to aspect-ratio difference exceeding a threshold, in accordance with some embodiments. The schematic diagram 900 includes a document (e.g., the document 300 of FIG. 3). The document is associated with an initial document layout 902. For example, the initial document layout 902 is associated with an initial aspect ratio having a width value of 300 pixels and a height value of 250 pixels. In some instances, the initial document layout 902 is characterized with a numerical array (0, 0, 300, 250) that identifies the location and size of the initial document layout 902. The initial document layout 902 identifies an initial bounding region 904 for a first background element. In some instances, the background element depicts another document (e.g., an image of an office). The initial bounding region 904 is located at an x-axis value of −20 and a y-axis value of −9, relative to the position of the document. The initial bounding region 904 also includes a width value of 324 pixels and a height value of 215 pixels. As such, the initial bounding region 904 is characterized with a numerical array (−20, −9, 324, 215) that identifies the location and size of the initial bounding region 904.

In addition, the initial document layout 902 identifies another initial bounding region 906 for a second background element. The initial bounding region 906 is located at an x-axis value of 0 and a y-axis value of 125, relative to the position of the document. The initial bounding region 906 also includes a width value of 300 pixels and a height value of 125 pixels. As such, the initial bounding region 906 is characterized with a numerical array (0, 125, 300, 125) that identifies the location and size of the initial bounding region 906.

The schematic diagram 900 also includes an output document having a modified document layout 908. For example, the modified document layout 908 is associated with a target width value of 728 pixels and a height value of 90 pixels. In some instances, the modified document layout 908 is characterized with a numerical array (0, 0, 728, 90) that identifies the location and size of the modified document layout 908. In addition to the modified document layout 908, the modified document layout 908 identifies a transformed bounding region 910 for the first background element. The transformed bounding region 910 corresponds to the initial bounding region 904 transformed in proportion to the modified document layout 908. For example, the transformed bounding region 910 is located at an x-axis value of −26 and a y-axis value of −6, relative to the position of the output document. The transformed bounding region 910 also includes a width value of 626 pixels and a height value of 97 pixels. As such, the transformed bounding region 910 is characterized with a numerical array (−26, −6, 626, 97) that identifies the location and size of the transformed bounding region 910.

Similarly, the modified document layout 908 identifies another transformed bounding region 912 for the second background element. The transformed bounding region 912 corresponds to the initial bounding region 906 transformed in proportion to the modified document layout 908. For example, the transformed bounding region 912 is located at an x-axis value of 364 and a y-axis value of 0, relative to the position of the output document. The transformed bounding region 912 also includes a width value of 364 pixels and a height value of 90 pixels. As such, the transformed bounding region 912 is characterized with a numerical array (364, 0, 364, 90) that identifies the location and size of the transformed bounding region 912.

Figure 10:
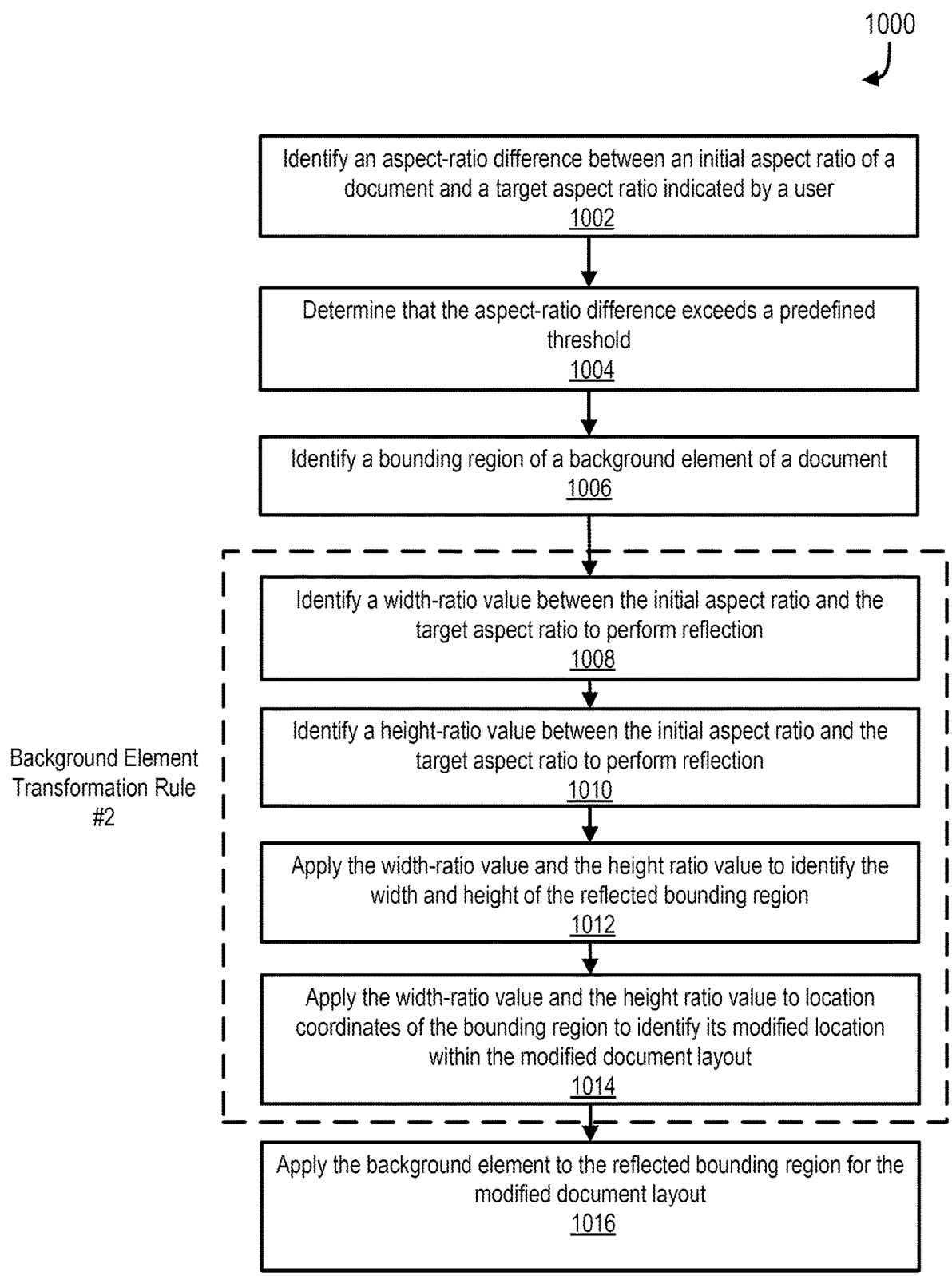
FIG. 10 illustrates a process for transforming background elements in response to aspect-ratio difference exceeding a threshold, in accordance with some embodiments.

FIG. 10 illustrates a process 1000 for transforming background elements in response to aspect-ratio difference exceeding a threshold, in accordance with some embodiments. For illustrative purposes, the process 1000 is described with reference to the components illustrated in FIG. 1, though other implementations are possible. For example, the program code for layout-modification application 116 of FIG. 1, which is stored in a non-transitory computer-readable medium, is executed by one or more processing devices to cause the server system 102 to perform one or more operations described herein.

At step 1002, the layout-modification application identifies an aspect-ratio difference between an initial aspect ratio of a document and a target aspect ratio indicated by a user device. For example, the aspect-ratio difference between the initial aspect ratio (e.g., 300:250=1.2) and the target aspect ratio (e.g., 728:90=8.089) is 6.889.

At step 1004, the layout-modification application determines that the aspect-ratio difference exceeds a predefined threshold. Similar to the above example in FIG. 8, the predefined threshold is 1.9. The layout-modification application uses the predefined threshold (1.9) to determine that the aspect-ratio difference between the two aspect ratios (e.g., 6.689) exceeds the predefined threshold. As noted above, the layout-modification application determines the aspect-ratio difference by a subtracting a lesser aspect ratio value from a greater aspect ratio value. Referring to this example, the layout-modification selects the initial aspect ratio (1.2) and subtracts it from the target aspect ratio (6.689), because the target aspect ratio has the greater value.

In some instances, a different threshold is selected in response to the layout-modification application determining a type of modification between the initial aspect ratio and the target aspect ratio. For example, the layout-modification application determines that the modification from the initial aspect ratio to the target aspect ratio corresponds to square-to-landscape layout-modification type and selects 1.9 as the predefined threshold. In another example, the layout-modification application determines that aspect-ratio difference between the initial aspect ratio and the target aspect ratio corresponds to a square-to-portrait modification type and selects 0.7 as the predefined threshold.

At step 1006, the layout-modification application identifies a bounding region of a background element of a document. The bounding region is characterized with a numerical array (−20, −8, 324, 215), in which a first sub-array (−20, −8) identifies a set of coordinates for the location and a second sub-array (324, 215) identifies the width and height pixel values of the initial bounding region.

At step 1008, the layout-modification application identifies a width-ratio value between the initial document layout's height and the target width to perform reflection of the bounding region. As referred herein, the reflection includes repositioning ("flipping") a given document element across a specified axis. For example, a given document element is flipped across a 45-degree axis to perform a 90-degree reflection. Because the aspect-ratio difference exceeds the predefined threshold, the position of the initial bounding region is reflected across a line extending through the document origin. To implement the reflection of the bounding region, the layout-modification application calculates the width-ratio value derived from a ratio between a height value of the initial document layout and a target width specified by a user device for modifying the document. For example, the width-ratio value is calculated by the target width divided by the height value of the initial document layout:

width_ratio_value=target_width/initial_height

Continuing with the example, the width-ratio value between the height of the initial document layout (e.g., 250 pixels) and the target width (e.g., 728 pixels) is 2.912.

At step 1010, the layout-modification application identifies a height-ratio value between the initial document layout's width and the target height to perform reflection of the bounding region. To implement the reflection of the bounding region, the layout-modification application calculates the height-ratio value derived from a ratio between a width value of the initial document layout and the target height. For example, the height-ratio value is calculated by the target height divided by a width value of the initial document layout:

height_ratio_value=target_height/initial_width

Continuing with the above example, the height-ratio value between the width of the initial aspect ratio (e.g., 300 pixels) and the height of the target aspect ratio (e.g., 90 pixels) is 0.3.

At step 1012, the layout-modification application applies the width-ratio value and the height ratio value to identify the reflected width and height of the identified bounding region. To continue with the reflection of the bounding region, the width for the transformed bounding region is calculated by multiplying a height of the bounding region with the identified width-ratio value, and the height for the transformed bounding region is calculated by multiplying a width of the bounding region with the identified height-ratio value. For example, the bounding region is transformed to have a width (transformed_element_width) and a height (transformed_element_height) using the following expression:

transformed_element_width=initial_element_height*width_ratio_value transformed_element_height=initial_element_width*height_ratio_value Continuing with the example, the width value for the transformed bounding region is 626 pixels, which is calculated by multiplying the height of the initial bounding region (e.g., 215 pixels) with the calculated width-ratio value (e.g., 2.912). In addition, the height value for the transformed bounding region is 97 pixels, which is calculated by multiplying the width of the initial bounding region (e.g., 324 pixels) with the calculated height-ratio value (e.g., 0.3).

At step 1014, the layout-modification application applies the width-ratio value and the height ratio value to location coordinates of the bounding region to identify its modified location within the modified document layout. For example, the location, at coordinates (transformed element x, transformed element y), of the bounding region with the reflection rule is identified using the following expression:

transformed_element_x=initial_element_y*width_ratio_value transformed_element_y=initial_element_x*height_ratio_value Continuing with the example, the x-axis value for the transformed bounding region is −26, which is calculated by multiplying the y-axis value of the initial bounding region (e.g., −9) with the calculated width-ratio value (e.g., 2.912). In addition, the y-axis for the reflected bounding region 910 is −6, which is calculated by multiplying the x-axis value of the initial bounding region 904 (e.g., −20) with the calculated height-ratio value (e.g., 0.3).

At step 1016, the layout-modification application applies the background element to the reflected bounding region for the modified document layout. Continuing with the example, the transformed bounding region is characterized with a numerical array (−26, −6, 626, 97), to which the background element is applied. The reflected bounding region includes the background element or a portion of the background element. As such, the background element is modified in proportion to the size and location identified for the transformed bounding region. In some instances, the background element is modified through various types of transformation rules (e.g., crop), which are further described in FIG. 11 herein below. In some embodiments, steps 1006 to 1016 for other background elements, thereby generating a set of background elements that are applied to their respective transformed bounding regions for the modified document layout. Process 1000 terminates thereafter.

(c) Applying the Background Element to the Transformed Bounding Region

Figure 11:
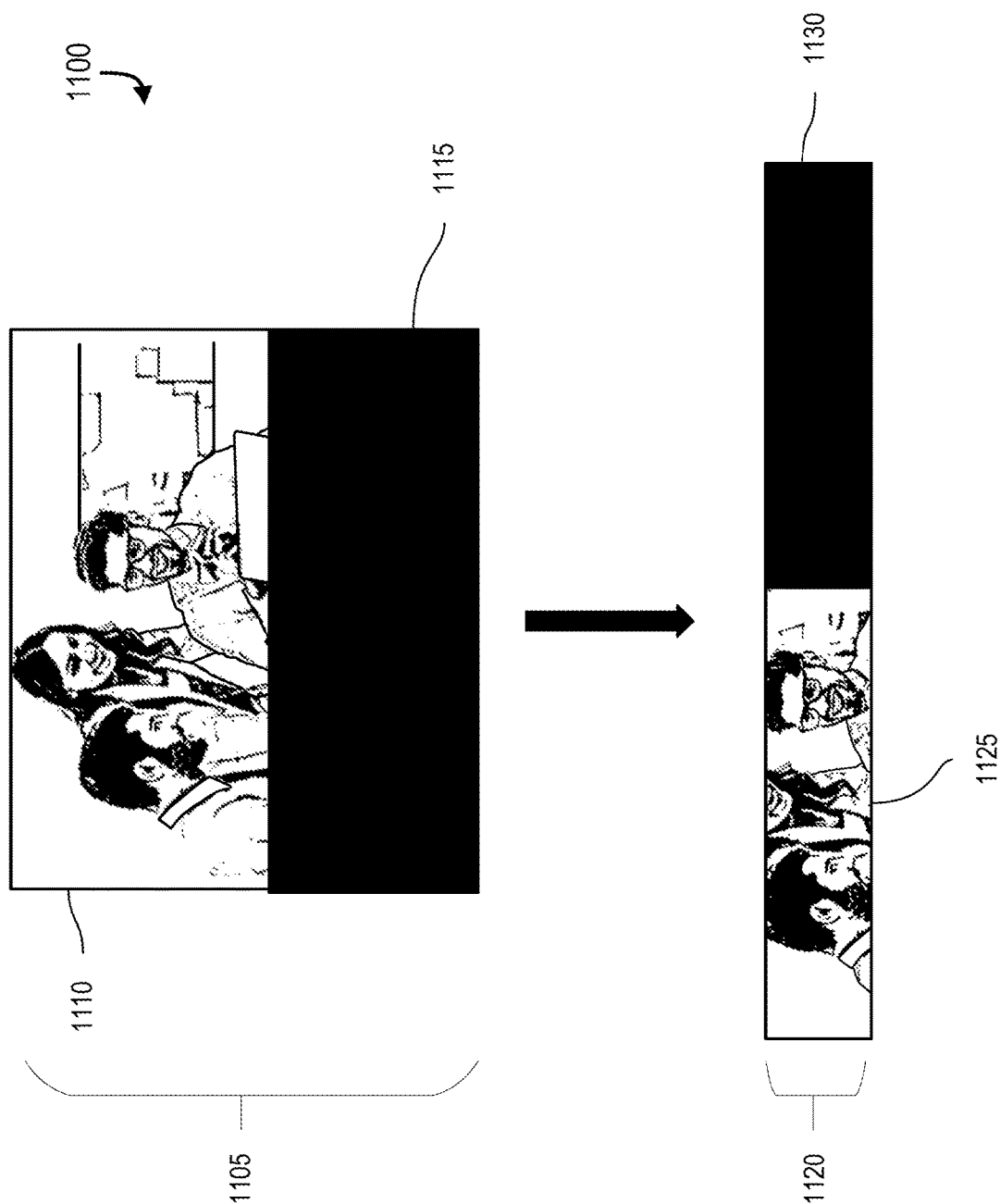
FIG. 11 illustrates a schematic diagram for applying background elements to the transformed bounding regions in accordance with some embodiments.

FIG. 11 illustrates a schematic diagram 1100 for applying background elements to the transformed bounding regions in accordance with some embodiments. FIG. 11 depicts an input document 1105 that includes an initial document layout. The input document 1105 includes a first background element 1110, which depicts an image of people. The first background element 1110 is identified at a top location relative to the input document 1105 and is associated with its respective set of measurements (e.g., width, height). The input document 1105 also includes a second background element 1115, which depicts a filled pattern with black color. The second background element 1115 is identified at a bottom location relative to the input document 1105 and is associated with its respective set of measurements.

In several embodiments, a layout-modification application (e.g., the layout-modification application 116 of FIG. 1)

classifies background elements in different categories: (i) an image category; (ii) a fill-pattern category; and (ii) a gradient-pattern category. In some instances, the layout-modification application uses the classified category to select and apply a different set of document transformation rules to modify content (e.g., image content, text, user-interface elements) of the background elements. In some embodiments, the layout-modification application does not scale a background element classified under the document category, but crops one or more of its portions to have the same aspect ratio as that of the transformed bounding region. In effect, document-content distortions that could result from scaling the background elements can be avoided while cropped content still identifies meaningful information for the modified document layout. In some instances, the layout-modification application applies a machine-learning algorithm to the background element to crop its portions, such that dimensions of the cropped background element is proportional to the dimensions of the transformed bounding region. In some instances, the layout-modification application then scales the cropped background element to fit within transformed bounding region.

For example, the layout-modification application classifies the first background element 1110 under the image category. Then, the layout-modification application removes (e.g., performing a cropping operation) one or more portions of the first background element 1110 such that a first transformed background element 1125 has the aspect ratio of the transformed bounding region (e.g., the transformed bounding region 910 of FIG. 9). In some instances, the layout-modification application uses object-recognition algorithms to detect content depicted the background element and removes the one or more portions of the background element. The layout-modification application then scales the cropped background element, generating a background element that fits within the transformed bounding region.

With respect to a background element classified under the fill-pattern category, the layout-modification application performs a scaling operation. This is because document-content distortions is minimal for content with filled-color patterns. For example, the layout-modification application classifies the second background element 1115 (depicting a filled pattern with black color) under the fill-pattern category. Then, the layout-modification application performs a scaling operation on the second background element 1115 to generate a second transformed background element 1130. With respect to a background element classified under the gradient-pattern category, the layout-modification application performs a scaling operation and an optional gradient-reflection operation. To implement the gradient-reflection operation, the layout-modification application determines that the aspect-ratio difference between the initial and modified document layouts exceed the predefined threshold, detects an angle of the gradient pattern depicted in the background element, and reflects the angle of the gradient pattern in the background element.

In some instances, a bounding region of a background element is a parent container for a set of foreground elements. After the bounding region (e.g., the parent container) is transformed in response to modification of the initial document layout, the foreground elements depicted within the background element (e.g., children images) are scaled or reflected to fit within the bounding region. In effect, foreground elements are transformed in proportion to the transformed bounding region for the background element, and new location for each foreground element is identified.

FIG. 11 accordingly depicts an output document 1120 that includes a modified document layout. The output document 1120 includes the first transformed background element 1125, which depicts a cropped image of people. The first transformed background element 1125 is identified at a left location relative to the output document 1120 and is associated with its respective set of measurements that are different from those of the first background element 1110. In addition, the output document 1120 also includes the second transformed background element 1130 generated by applying transformation rules associated with fill-pattern category. For example, the second transformed background element 1130 is scaled into the transformed bounding region. The second transformed background element 1130 is identified at a right location relative to the output document 1120 and is associated with its respective set of measurements that are different from those of the second background element 1115.

Transforming Foreground Elements for Modified Document Layouts

As described herein, the layout-modification application determines whether a document element is a background element or a foreground element. By classifying background elements differently from foreground elements, the layout-modification application applies different transformation rules due to the differing characteristics of document elements that belong under these two categories. In some instances, the layout-modification application classifies a document element as a foreground element, in response to determining that: (i) fewer than three edges of an input document contact the bounding region corresponding to the document element; and (ii) an area ratio between the area of the bounding region and the area of the input document is less than a predefined threshold.

To transform a foreground element for a modified document layout, a layout-modification application (e.g., the layout-modification application 116 of FIG. 1) identifies the center point of a bounding region generated for a foreground element. The layout-modification application determines a new location for the bounding region. The layout-modification application modifies width and height of the bounding region and applies the foreground element to the transformed bounding region.

(a) Determining a New Location of the Foreground Element by Scaling

Figure 12:
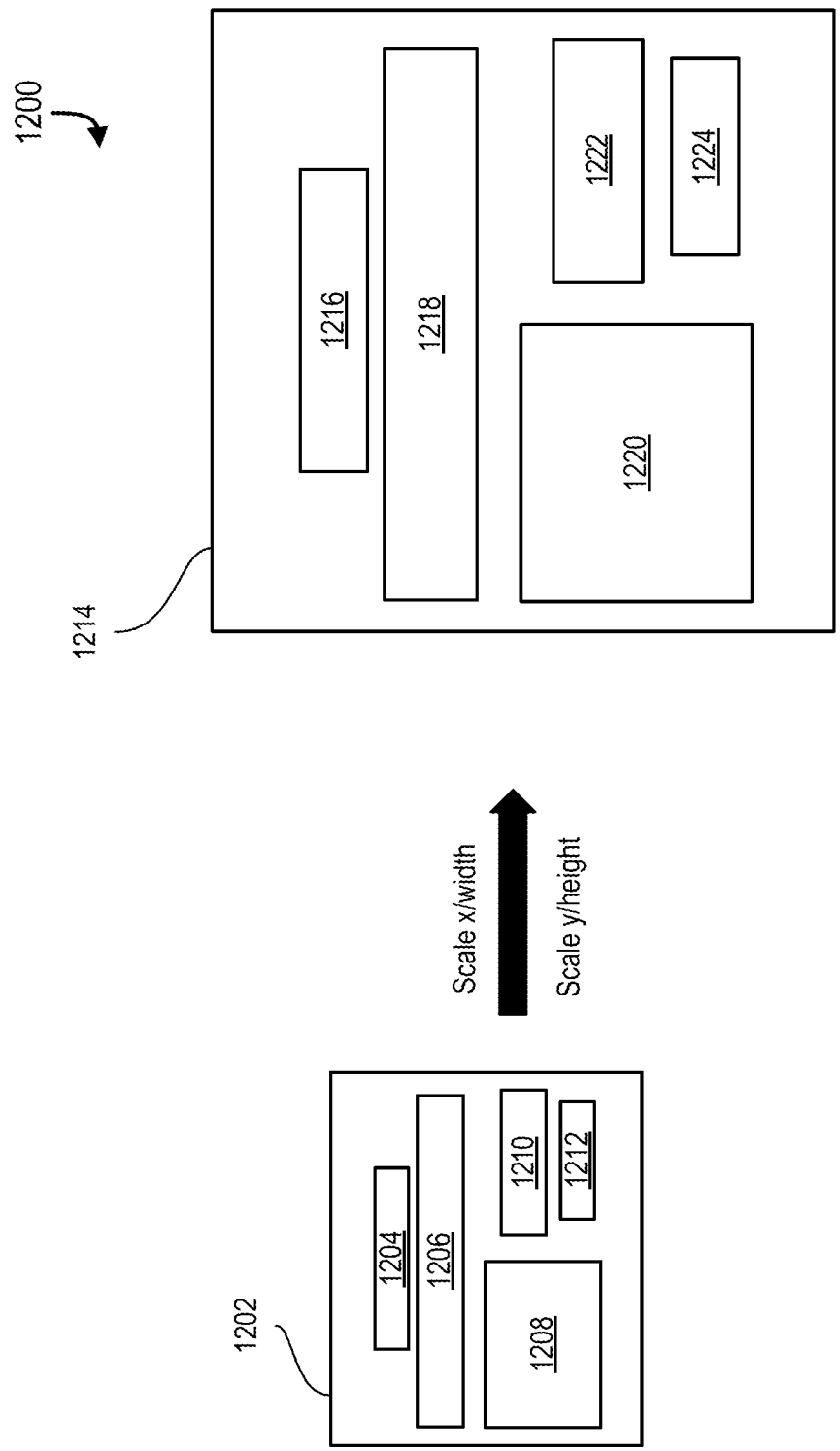
FIG. 12 shows a schematic diagram for identifying a new location of a foreground element in response to aspect-ratio difference being less than a threshold, in accordance with some embodiments.

FIG. 12 shows a schematic diagram 1200 for identifying a new location of a foreground element in response to aspect-ratio difference being less than a threshold, in accordance with some embodiments. The schematic diagram 1200 includes a document that is that is associated with an initial document layout 1202. For example, the initial document layout 1202 identifies an initial aspect ratio having a width value of 300 pixels and a height value of 250 pixels. In some instances, the initial document layout 1202 is characterized with a numerical array (0, 0, 300, 250) that identifies the location and size of the initial document layout 1202. The initial document layout 1202 identifies bounding regions 1204-1212 that are associated with their respective foreground elements. For example, a top-left corner vertex of the bounding region 1210 is located at an x-axis value of 164 and a y-axis value of 159, relative to the position of the document. The bounding region 1210 also includes a width value of 117 pixels and a height value of 36 pixels. As such, the bounding region 1210 is characterized with a numerical array (164, 159, 117, 36) that identifies the location and size of the bounding region 1210. In some instances, the foreground element depicts different types of content, including a logo, text, or a user-interface element (e.g., CallToAction).

The schematic diagram 1200 also includes an output document having a modified document layout 1214. For example, the modified document layout 1214 is associated with a width value of 500 pixels and a height value of 500 pixels. In some instances, the modified document layout 1214 is characterized with a numerical array (0, 0, 500, 500) that identifies the location and size of the modified document layout 1214. In addition, the modified document layout 1214 identifies transformed bounding regions 1216-1224. For example, the transformed bounding region 1222 corresponds to the bounding region 1210 transformed in proportion to the modified document layout 1214. In addition, the layout-modification application identifies a new center location of the transformed bounding region using width-ratio and height-ratio values calculated between the initial document layout 1202 and the modified document layout 1214.

Figure 13:
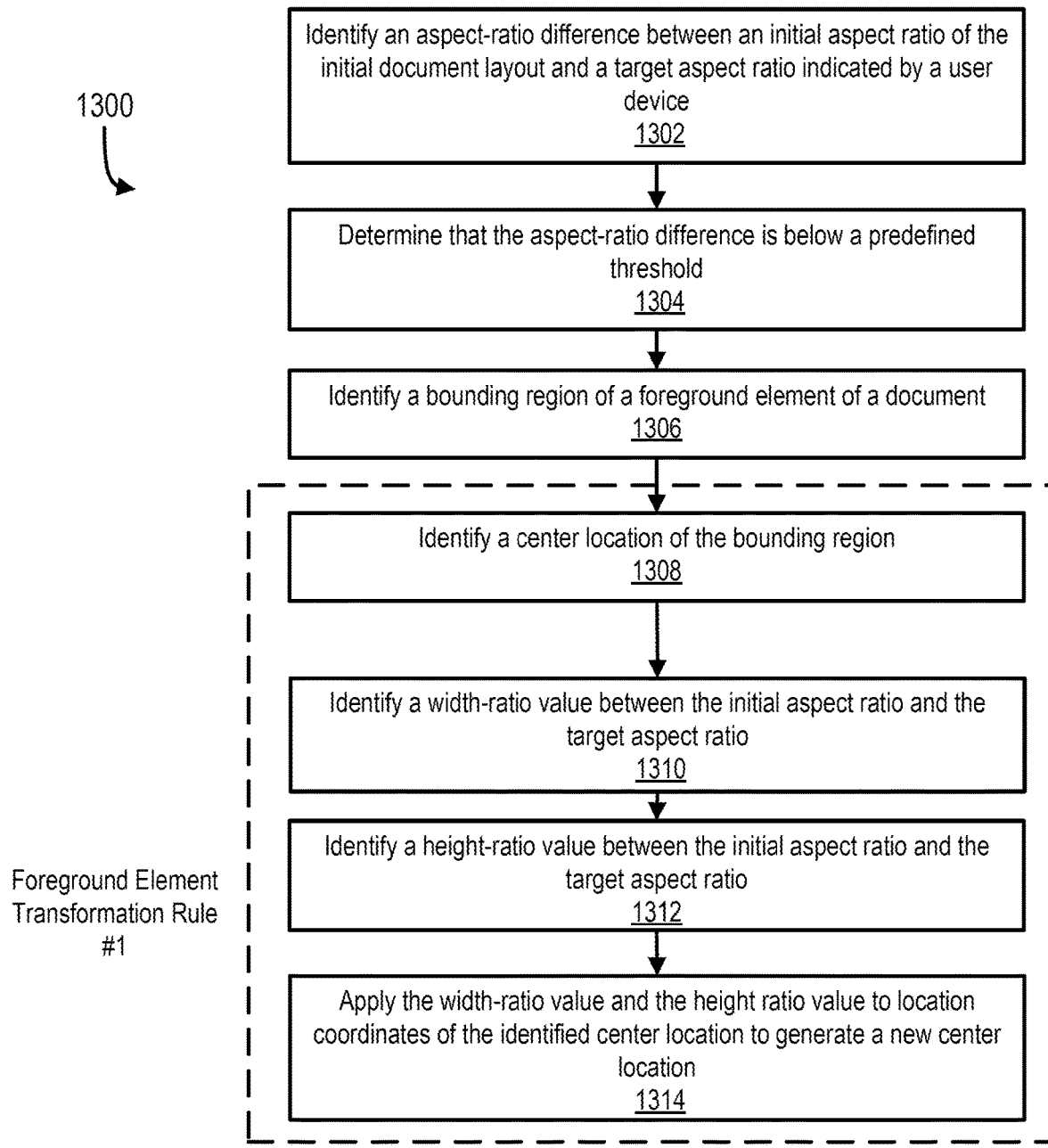
FIG. 13 illustrates a process for identifying a new location of a foreground element in response to aspect-ratio difference being less than a threshold, in accordance with some embodiments

FIG. 13 illustrates a process 1300 for identifying a new location of a foreground element in response to aspect-ratio difference being less than a threshold, in accordance with some embodiments. For illustrative purposes, the process 1300 is described with reference to the components illustrated in FIG. 1, though other implementations are possible. For example, the program code for layout-modification application 116 of FIG. 1, which is stored in a non-transitory computer-readable medium, is executed by one or more processing devices to cause the server system 102 to perform one or more operations described herein.

At step 1302, the layout-modification application identifies an aspect-ratio difference between an initial aspect ratio of the initial document layout and a target aspect ratio indicated by a user device. For example, the aspect-ratio difference between the initial aspect ratio (e.g., 300: 250=1.2) and the target aspect ratio (e.g., 500:500=1) is 0.2. In this example, the layout-modification selects the target aspect ratio (1) and subtracts it from the initial aspect ratio (1.2), because the initial aspect ratio has a greater value.

At step 1304, the layout-modification application determines that the aspect-ratio difference is less than a predefined threshold. Continuing with the example, the predefined threshold is 0.7. The layout-modification application uses the predefined threshold (0.7) as an input to determine that the aspect-ratio difference between the initial aspect ratio and the target aspect ratio (e.g., 0.2) is below the predefined threshold.

At step 1306, the layout-modification application identifies a bounding region of a foreground element of a document. As described above, the bounding region is characterized with a numerical array (164, 159, 117, 36), in which a first sub-array (164, 159) identifies a set of location coordinates for the location and a second sub-array (117, 36) identifies the width and height pixel values of the bounding region.

At step 1308, the layout-modification application identifies a center location of the bounding region. Continuing with the example, the layout-modification application identifies an x-axis value of the center location of the bounding region by first dividing the width value of the bounding region by 2, then adding the divided value with the sum of x-axis coordinate value of the left-top corner the bounding region (e.g., 164+(117/2)=222). In addition, the layout-modification application identifies a y-axis value of the center location of the bounding region by first dividing height value of the bounding region by 2, then adding the divided value with the y-axis coordinate value of the left-top corner the bounding region (e.g., 159+(36/2)=177). The layout-modification application uses the above values as input to determine the center location of the bounding region characterized with a set of location coordinates (222, 177).

At step 1310, the layout-modification application identifies a width-ratio value between the initial document width and the target width specified by the user device. For example, the width-ratio value is calculated by the target width value divided by the width value of the initial document layout:

width_ratio_value=target_width/initial_width

Continuing with the example, the width-ratio value between the width of the initial document layout (e.g., 300 pixels) and the target width (e.g., 500 pixels) is 1.667.

At step 1312, the layout-modification application identifies a height-ratio value between the initial aspect ratio and the target aspect ratio. For example, the height-ratio value is calculated by a height value of the target aspect ratio divided by a height value of the initial aspect ratio:

height_ratio_value=target_height/initial_height

Continuing with the example, the height-ratio value between the initial aspect ratio (e.g., 250 pixels) and the target aspect ratio (e.g., 500 pixels) is 2.

At step 1314, the layout-modification application applies the width-ratio value and the height ratio value to location coordinates of the center location of the bounding region to identify its modified center location within the modified document layout. For example, the location of the bounding region, at coordinates (transformed element x, transformed element y), is identified using the following expression:

transformed_element_x=initial_element_x*width_ratio_value transformed_element_y=initial_element_y*height_ratio_value Continuing with the example, an x-axis value for a center location of the transformed bounding region is 370, which is calculated by multiplying the x-axis value of the center location of the bounding region (e.g., 222) with the calculated width-ratio value (e.g., 1.667). In addition, a y-axis value for the center location of the transformed bounding region is 354, which is calculated by multiplying the y-axis value of the center location of the bounding region (e.g., 177) with the calculated height-ratio value (e.g., 2). Thus, the new center location of the transformed bounding region is characterized with a set of location coordinates (370, 354). In some embodiments, steps 1306 to 1314 are performed for each of the other foreground elements in the initial document layout, thereby generating new locations for respective foreground elements. Process 1300 terminates thereafter.

Figure 14:
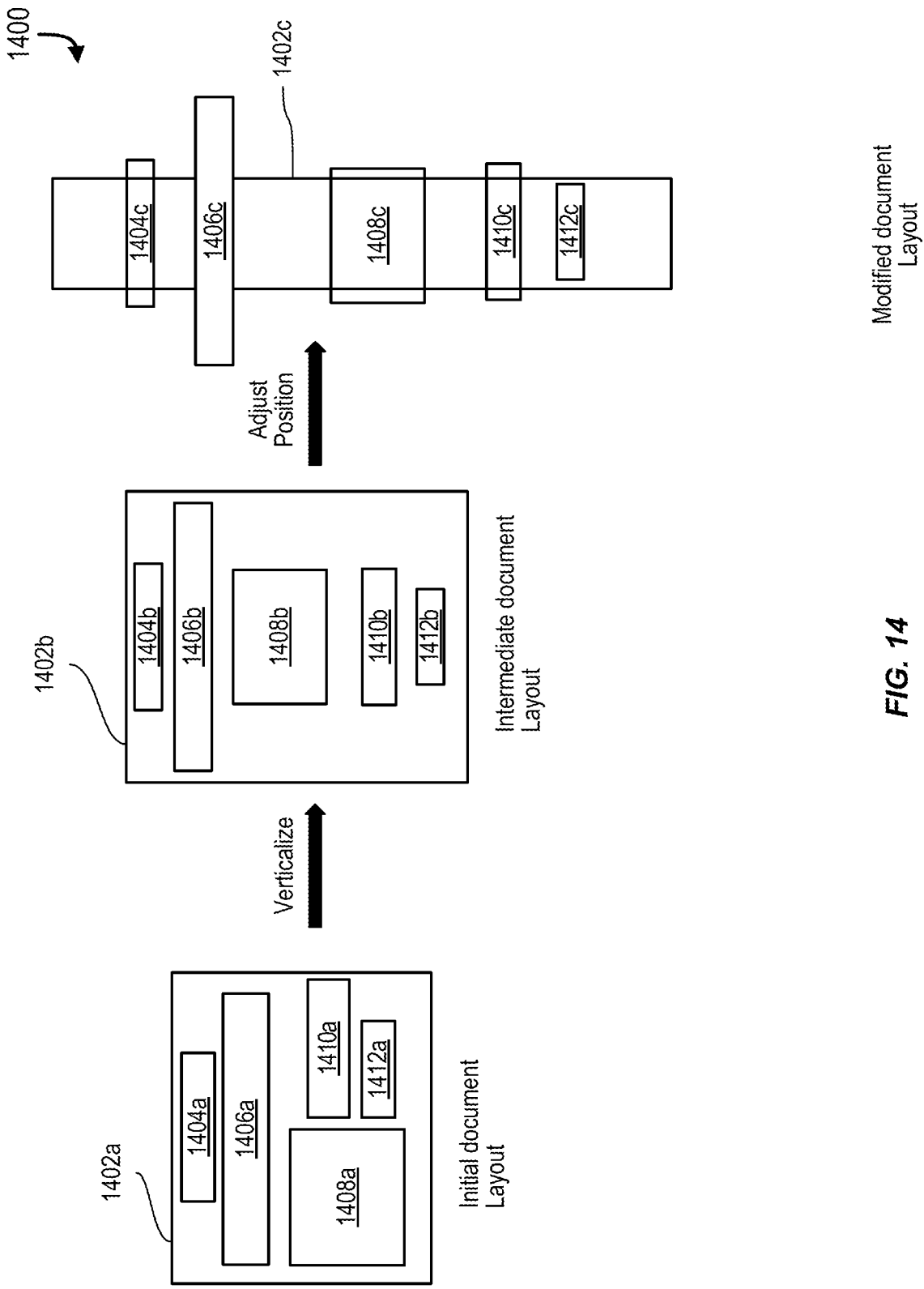
FIG. 14 shows a schematic diagram for identifying a new location of a foreground element in response to aspect-ratio difference exceeding a threshold, in accordance with some embodiments.

(b) Determining a New Location of the Foreground Element by Restructuring Columns of the Document Layout FIG. 14 shows a schematic diagram 1400 for identifying a new location of a foreground element in response to aspect-ratio difference exceeding a threshold, in accordance with some embodiments. The schematic diagram 1400 includes an input document (e.g., the document 300 of FIG. 3). The document is associated with an initial document layout 1402a. The initial document layout 1402a has a width value of 300 pixels and a height value of 250 pixels. These determine an initial aspect ratio of 1.2. The initial document layout 1402a also identifies initial bounding regions 1404a-1412a that correspond to their respective foreground elements. As described above, the foreground element include different types of content, such as a logo, a document, a text, or a user-interface element (e.g., CallToAction).

The schematic diagram 1400 further includes an intermediate document. The intermediate document is associated with an intermediate document layout 1402*b*. The intermediate document layout 1402*b* has an aspect ratio that is different from the initial aspect ratio and the target aspect ratio. The intermediate document layout 1402*b* identifies intermediate bounding regions 1404*b*-1412*b* that correspond to their respective foreground elements. The schematic diagram 1400 further includes an output document. The output document is associated with a modified document layout 1402*c*. The modified document layout 1402*c* has a target width value of 160 pixels and a target height value of 600 pixels. These determine a target aspect ratio of 0.267. The modified document layout 1402*c* identifies modified bounding regions 1404*c*-1412*c* that correspond to their respective foreground elements.

Figure 15:
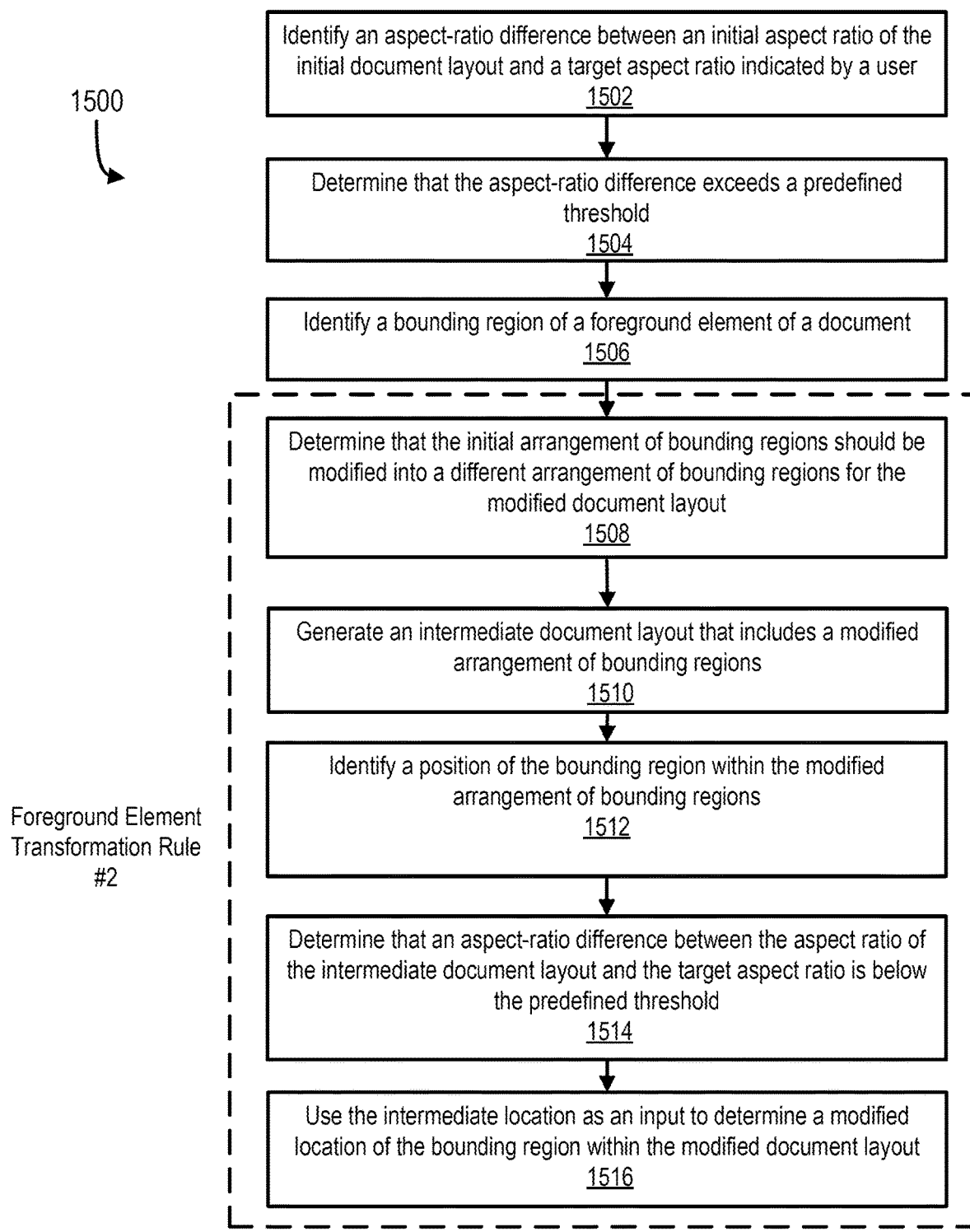
FIG. 15 illustrates a process for identifying a new location of a foreground element in response to aspect-ratio difference exceeding a threshold, in accordance with some embodiments.

FIG. 15 illustrates a process 1500 for identifying a new location of a foreground element in response to aspect-ratio difference exceeding a threshold, in accordance with some embodiments. For illustrative purposes, the process 1500 is described with reference to the components illustrated in FIG. 1, though other implementations are possible. For example, the program code for layout-modification application 116 of FIG. 1, which is stored in a non-transitory computer-readable medium, is executed by one or more processing devices to cause the server system 102 to perform one or more operations described herein.

At step 1502, the layout-modification application identifies an aspect-ratio difference between an initial aspect ratio of the initial document layout and a target aspect ratio indicated by a user device. For example, the aspect-ratio difference between the initial aspect ratio (e.g., 300: 250=1.2) and the target aspect ratio (e.g., 160:600=0.267) is 0.933. In this example, the layout-modification selects the target aspect ratio (0.267) and subtracts it from the initial aspect ratio (1.2), because the initial aspect ratio has a greater value.

At step 1504, the layout-modification application determines that the aspect-ratio difference exceeds a predefined threshold. Continuing with the example, the predefined threshold is 0.7. The layout-modification application uses the predefined threshold (0.7) as input to determine that the aspect-ratio difference between the initial aspect ratio and the target aspect ratio (e.g., 0.933) exceeds the predefined threshold.

At step 1506, the layout-modification application identifies a bounding region of a foreground element of a document. As described above, the bounding region is characterized with a numerical array that identifies a set of location coordinates for its location, as well as the width and height pixel values of the bounding region.

At step 1508, the layout-modification application determines that the initial arrangement of bounding regions should be modified into a different arrangement of bounding regions for the modified document layout. For example, the layout-modification application determines that the initial arrangement of bounding regions should be modified into a different arrangement if at least one of the bounding regions of the initial document layout satisfies two conditions: (i) whether an x-coordinate value of a particular location (e.g., upper-left corner) of the bounding region is greater than an x-coordinate value of the initial document layout that corresponds to a threshold percentage (e.g., 40%) of its width; and (ii) whether the area of the bounding region exceeds an threshold percentage (e.g., 10%) of the area of the initial document layout.

At step 1510, the layout-modification application generates an intermediate document layout that includes a modified arrangement of the bounding regions. In some embodiments, the conversion to the intermediate document layout that includes the modified arrangement of the bounding regions is referred herein as a "verticalize" operation, as the intermediate document layout are arranged into a single column/row arrangement. An area of the intermediate document layout is defined relative to widths and heights of the bounding regions. For example, a width value corresponding to the intermediate document layout is a sum of a width value of a bounding region having the highest width value and a set of predetermined margin values. In another example, a height value corresponding to the intermediate document layout is a sum of height values of all bounding regions, spacing values (e.g., vertical spacing) between two of the bounding regions within the initial document layout, and another set of predetermined margin values. The modified arrangement of bounding regions differs from the initial arrangement of bounding regions. For example, the modified arrangement indicates a single-column alignment of the bounding regions, compared with a two-column alignment of the bounding regions for the initial arrangement in the initial document layout.

At step 1512, the layout-modification application identifies a position of the bounding region within the modified arrangement of bounding regions. For example, the layout-modification application determines that the bounding region is located at a right column of an initial two-column arrangement of bounding regions within the initial document layout. The layout-modification application then identifies a position of the bounding region within the modified arrangement including an arrangement of bounding regions as a single column for the modified document layout.

To determine the position of the bounding region relative to other bounding regions within the modified arrangement, the layout-modification application determines a y-coordinate value of a particular point (e.g., left-upper corner) in the bounding region. The y-coordinate value of the bounding region is then compared with y-coordinate values of other bounding regions, such that the modified arrangement identifies a vertical arrangement of the bounding regions at an ascending order of y-coordinate values. For example, if the bounding region has a y-coordinate value of 5, the layout-modification application identifies the position of the bounding region as being above another bounding region having a y-coordinate value of 7. In some instances, x-coordinate values of the bounding regions are used to determine the respective positions of the bounding regions within the modified arrangement. For example, in response to determining that two bounding regions have the same y-coordinate value, the layout-modification application identifies their respective x-coordinate values and arranges the two bounding regions at an ascending order of x-coordinate values.

At step 1514, the layout-modification application determines that an aspect-ratio difference between the aspect ratio of the intermediate document layout and the target aspect ratio is below the predefined threshold. Continuing with the example, the aspect ratio of the intermediate document layout is associated with a width value of 300 pixels and a height value of 500 pixels. The aspect-ratio difference between the aspect ratio of the intermediate document layout (e.g., 350:500=0.6) and the target aspect ratio (e.g., 160: 600=0.267) is 0.333. As a result, the layout-modification application determines that the aspect-ratio difference is below the predefined threshold, which is 0.7.

At step 1516, the layout-modification application uses the identified position of the bounding region as an input to determine a modified location of the bounding region within the modified document layout. In some instances, the layout-modification application identifies a center location of the bounding region within the intermediate document layout, calculates width-ratio and height-ratio values between the width and height of the intermediate document layout and the target width and target height, and applies the width-ratio value to an x-axis value of the center location and height-ratio value to a y-axis value of the center location to generate a modified center location for the bounding region for the modified document layout. In some embodiments, steps 1506 to 1516 are performed for each of the other foreground elements in the initial document layout, thereby generating new locations for respective foreground elements. Process 1500 terminates thereafter.

Figure 16:
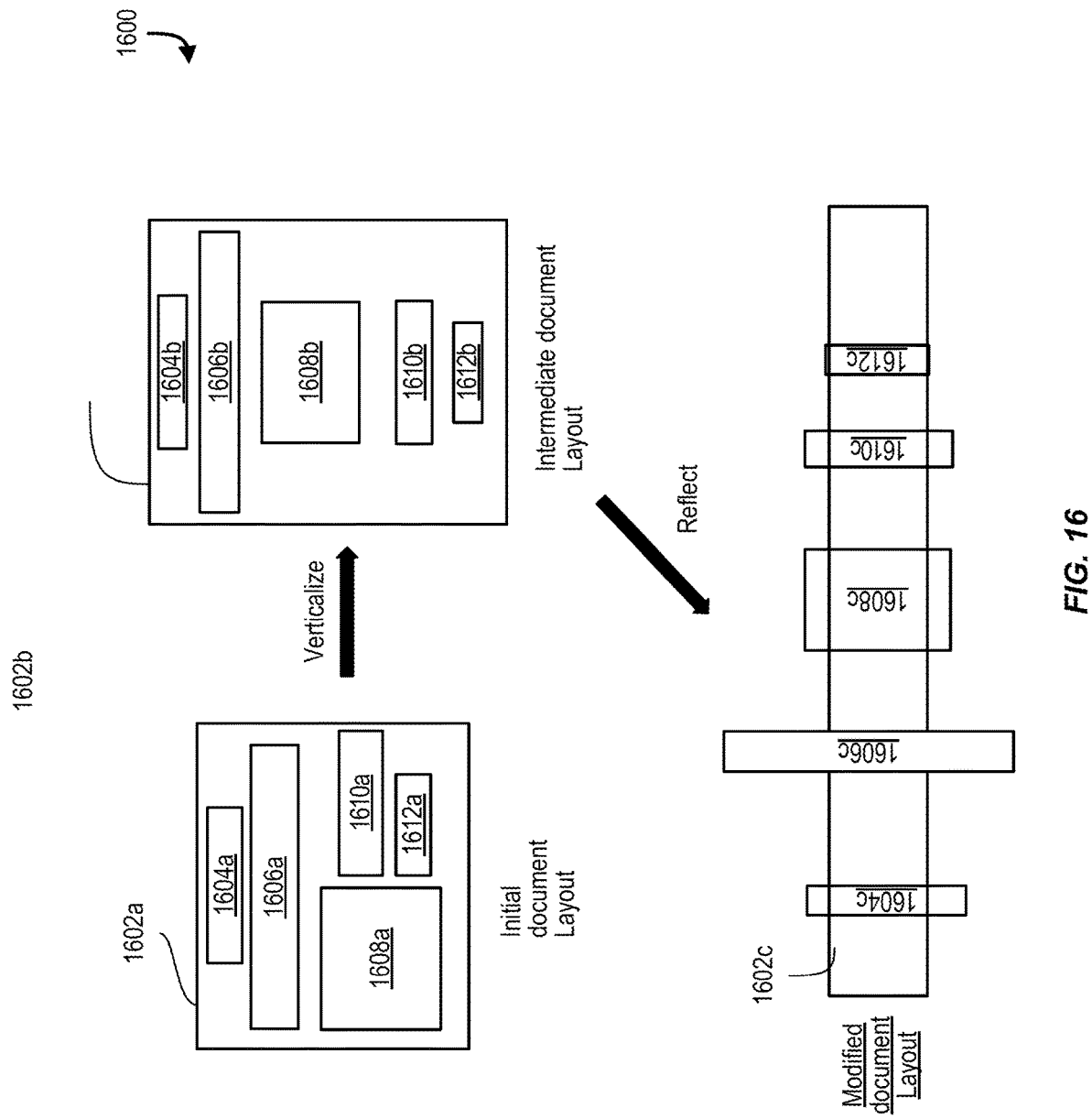
FIG. 16 shows a schematic diagram for reflecting a foreground element to identify a new location in a modified arrangement of document elements, in accordance with some embodiments.

(c) Determining a New Location of the Foreground Element by Reflection of the Element and Restructuring Columns of the Document Layout FIG. 16 shows a schematic diagram 1600 for reflecting a foreground element to identify a new location in accordance with some embodiments. The schematic diagram 1600 includes an input document (e.g., the document 300 of FIG. 3). The document is associated with an initial document layout 1602*a*. The initial document layout 1602*a* has a width value of 300 pixels and a height value of 250 pixels. These determine an initial aspect ratio of 1.2. The initial document layout 1602*a* identifies initial bounding regions 1604*a*-1612*a* that correspond to their respective foreground elements. As described above, the foreground element include different types of content, such as a logo, text, or a user-interface element (e.g., CallToAction).

The schematic diagram 1600 further includes an intermediate document. The intermediate document is associated with an intermediate document layout 1602*b*. The intermediate document layout 1602*b* has an aspect ratio that is different from the initial aspect ratio and the target aspect ratio. The intermediate document layout 1402*b* identifies intermediate bounding regions 1604*b*-1612*b* that correspond to their respective foreground elements. The schematic diagram 1600 further includes an output document. The output document is associated with a modified document layout 1602*c*. For example, the modified document layout 1602*c* has a target width value of 728 pixels and a target height value of 90 pixels. These determine a target aspect ratio of 8.089. The modified document layout 1602*c* also includes modified bounding regions 1604*c*-1612*c* that correspond to their respective foreground elements.

Figure 17:
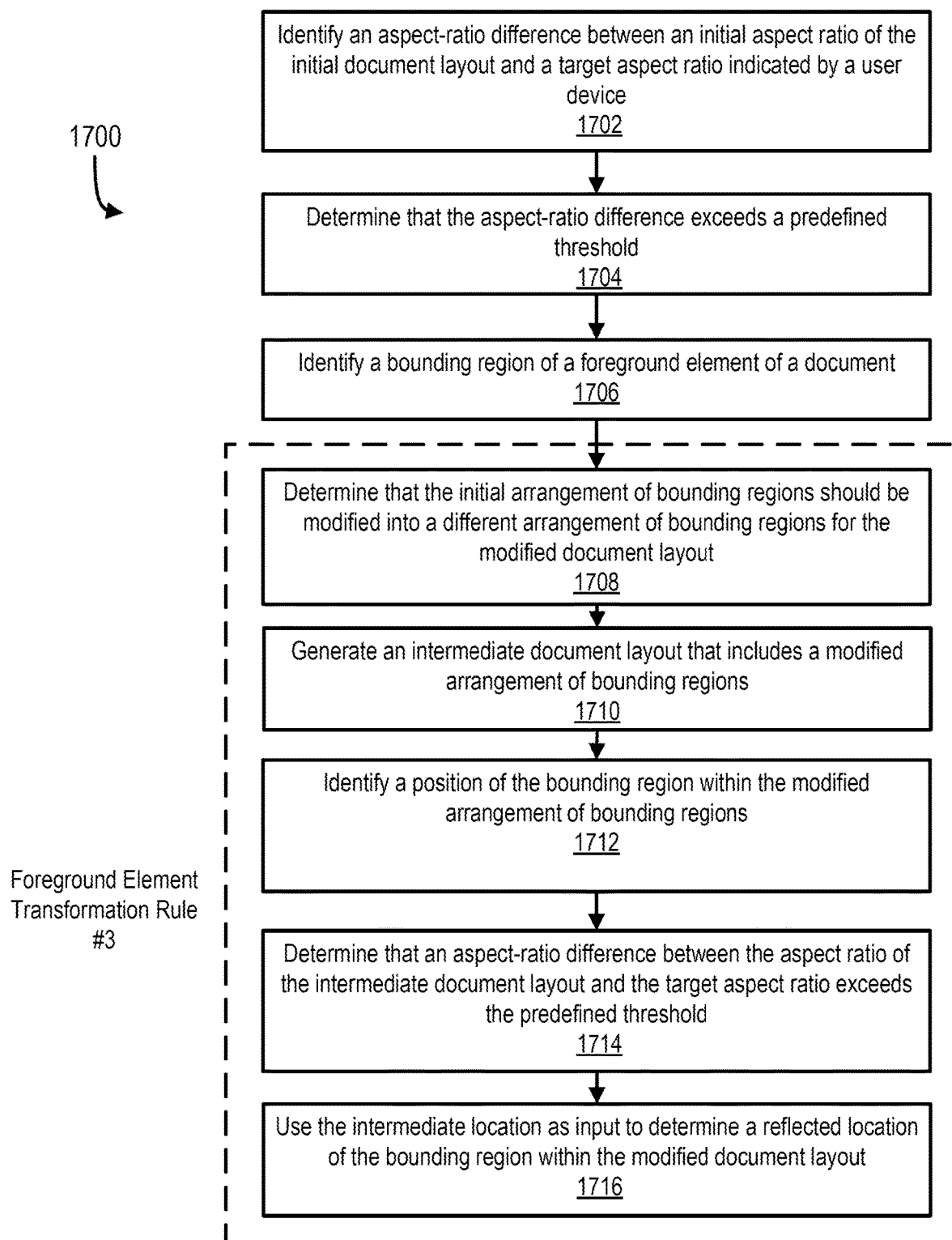
FIG. 17 illustrates a process for reflecting a foreground element to identify a new location in a modified arrangement of document elements, in accordance with some embodiments.

FIG. 17 illustrates a process 1700 for reflecting a foreground element to identify a new location in accordance with some embodiments. For illustrative purposes, the process 1700 is described with reference to the components illustrated in FIG. 1, though other implementations are possible. For example, the program code for layout-modification application 116 of FIG. 1, which is stored in a non-transitory computer-readable medium, is executed by one or more processing devices to cause the server system 102 to perform one or more operations described herein.

At step 1702, the layout-modification application identifies an aspect-ratio difference between an initial aspect ratio of the initial document layout and a target aspect ratio indicated by a user device. As described above, the aspect-difference can be an absolute value of a different between the initial aspect ratio and the target aspect ratio. For example, the aspect-ratio difference between the initial aspect ratio (e.g., 300:250=1.2) and the target aspect ratio (e.g., 728: 90=8.089) is 6.889. In this example, the layout-modification selects the initial aspect ratio (1.2) and subtracts it from the target aspect ratio (6.689), because the target aspect ratio has the greater value.

At step 1704, the layout-modification application determines that the aspect-ratio difference exceeds a predefined threshold. Continuing with the example, the predefined threshold is 0.7. The layout-modification application uses the predefined threshold (0.7) as input to determine that the aspect-ratio difference between the initial document layout and the modified document layout (e.g., 6.889) exceeds the predefined threshold.

At step 1706, the layout-modification application identifies a bounding region of a foreground element of a document. As described above, the bounding region is characterized with a numerical array that identifies a set of location coordinates for its location, as well as the width and height pixel values of the bounding region.

At step 1708, the layout-modification application determines that the initial arrangement of bounding regions should be modified into a different arrangement of bounding regions for the modified document layout. For example, the layout-modification application determines that the initial arrangement of bounding regions should be modified into a different arrangement if at least one of the bounding regions of the initial document layout satisfies two conditions: (i) whether an x-coordinate value of a particular location (e.g., upper-left corner) of the bounding region is greater than an x-coordinate value of the initial document layout that corresponds to a threshold percentage (e.g., 40%) of its width; and (ii) whether the area of the bounding region exceeds an threshold percentage (e.g., 10%) of the area of the initial document layout.

At step 1710, the layout-modification application generates an intermediate document layout that includes a modified arrangement of the bounding regions. As noted above, the conversion to the intermediate document layout that includes the modified arrangement of the bounding regions can be a "verticalize" operation. An area of the intermediate document layout is defined relative to widths and heights of the bounding regions. For example, a width value corresponding to the intermediate document layout the width value of a bounding region having the highest width value and a set of predetermined margin values. In another example, a height value corresponding to the intermediate document layout is a sum of height values of all bounding regions, spacing values (e.g., vertical spacing) between two of the bounding regions within the initial document layout, and another set of predetermined margin values. The modified arrangement of bounding regions differs from the initial arrangement of bounding regions. For example, the modified arrangement indicates a single-column alignment of the bounding regions, compared with a two-column alignment of the bounding regions for the initial arrangement in the initial document layout.

At step 1712, the layout-modification application identifies a position of the bounding region within the modified arrangement of bounding regions. For example, the layout-modification application determines that the bounding region is located at a right column of an initial two-column arrangement of bounding regions within the initial document layout. The layout-modification application then identifies a position of the bounding region within the modified arrangement including an arrangement of bounding regions as a single column for the modified document layout.

To determine the position of the bounding region relative to other bounding regions within the modified arrangement, the layout-modification application determines a y-coordinate value of a particular point (e.g., left-upper corner) in the bounding region. The y-coordinate value of the bounding region is then compared with y-coordinate values of other bounding regions, such that the modified arrangement identifies a vertical arrangement of the bounding regions at an ascending order of y-coordinate values. For example, if the bounding region has a y-coordinate value of 5, the layout-modification application identifies the position of the bounding region as being above another bounding region having a y-coordinate value of 7. In some instances, x-coordinate values of the bounding regions are used to determine the respective positions of the bounding regions within the modified arrangement. For example, in response to determining that two bounding regions have the same y-coordinate value, the layout-modification application identifies their respective x-coordinate values and arranges the two bounding regions at an ascending order of x-coordinate values.

At step 1714, the layout-modification application determines that an aspect-ratio difference between the aspect ratio of the intermediate document layout and the target aspect ratio exceeds the predefined threshold. Continuing with the example, the aspect ratio of the intermediate document layout is associated with a width value of 300 pixels and a height value of 500 pixels. The aspect-ratio difference between the aspect ratio of the intermediate document layout (e.g., 350:500=0.6) and the target aspect ratio (e.g., 728:90=8.089) is 7.489. As a result, the layout-modification application determines that the aspect-ratio difference exceeds the predefined threshold, which is 0.7.

At step 1716, the layout-modification application uses the intermediate location as input to determine a reflected location of the bounding region within the modified document layout. In some instances, the layout-modification application identifies a center location of the intermediate bounding region within the intermediate document layout. In some instances, the layout-modification application determines a width-ratio value based on the height of the intermediate document layout and the target width. The layout-modification application also determines a height-ratio value based on the width of the intermediate document layout and the target height. The layout-modification then applies the width-ratio value to the y-coordinate value of the intermediate bounding region to obtain a new x-coordinate location of the transformed bounding region. Similarly, the layout-modification application applies the height-ratio value to the x-coordinate value of the intermediate bounding region to obtain a new y-coordinate location of the transformed bounding region. As a result, a reflected center location for the bounding region is determined for the modified document layout. For example, a reflected location, at coordinates (new_element_location_x, new_element_location_y), of the bounding region within the modified document layout is identified based on the following set of equations:

scaling_ratio_$x$=target_width/intermediate_height new_element_location_$x$=source_element_intermediate_location_$y$*scaling_ratio_$x$ scaling_ratio_$y$=target_height/intermediate_width new_element_location_$y$=source_element_intermediate_location_$x$*scaling_ratio_$y$ With respect to the above sets of equations, the target width corresponds to the target width, and the intermediate height corresponds to the height of the intermediate document layout. These two values are used to determine a scaling_ratio_x value, which in turn is used to identify an x-coordinate value (new_element_location_x) of the reflected, center location of the bounding region. Similarly, the target_height corresponds to the target height, and the intermediate_width corresponds to the width of the intermediate document layout. These two values are used to determine a scaling_ratio_y value, which in turn is used to identify an y-coordinate value (new_element_location_y) of the reflected, center location of the bounding region.

In some embodiments, steps 1706 to 1716 are performed for other foreground elements, thereby generating reflected locations of the respective bounding regions for the other foreground elements. Process 1700 terminates thereafter.

Figure 18:
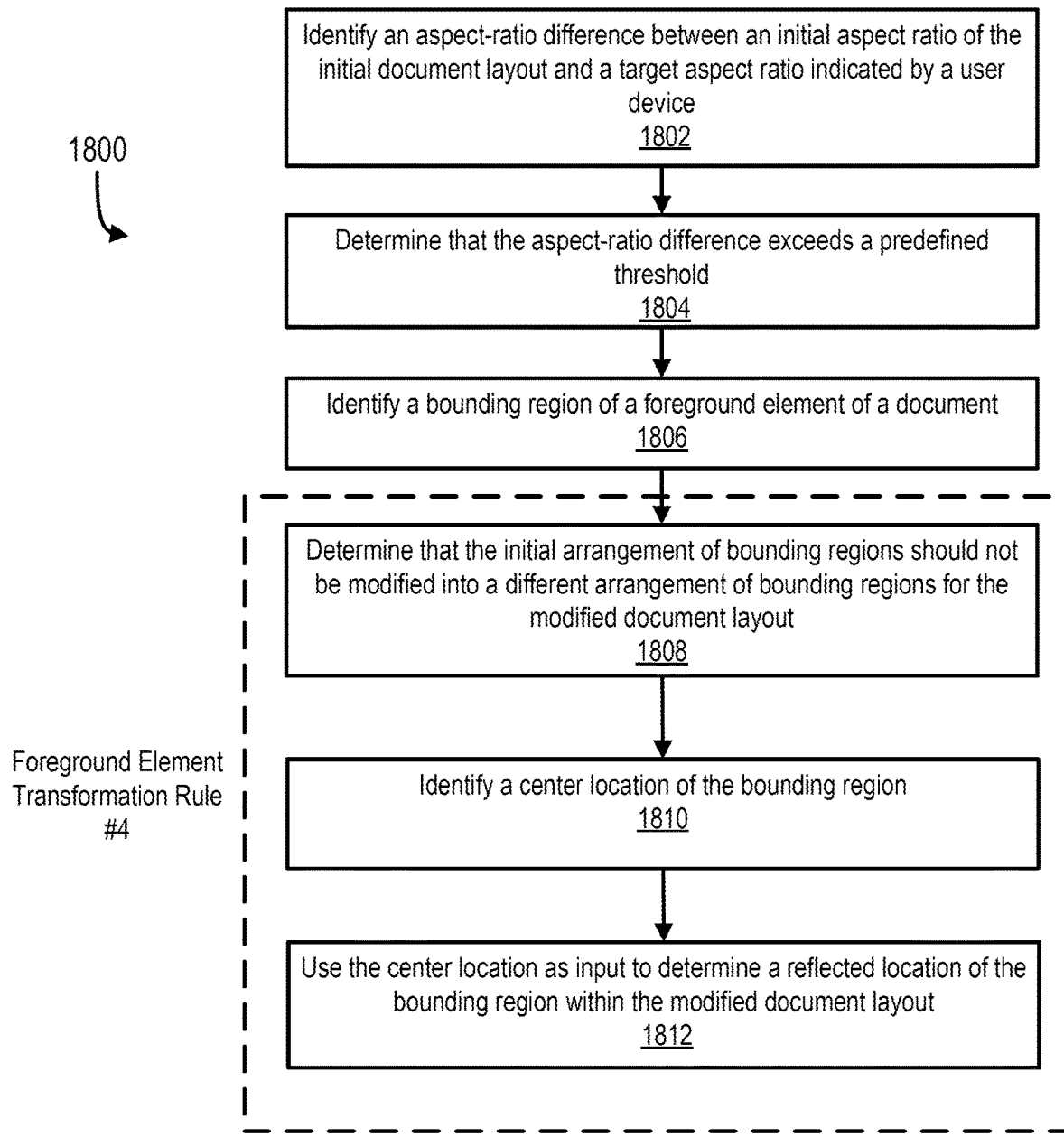
FIG. 18 illustrates a process for reflecting a foreground element to identify a new location, in accordance with some embodiments.

(d) Determining a New Location of the Foreground Element by Reflection of the Element FIG. 18 illustrates a process 1800 for reflecting a foreground element to identify a new location in accordance with some embodiments. For illustrative purposes, the process 1800 is described with reference to the components illustrated in FIG. 1, though other implementations are possible. For example, the program code for layout-modification application 116 of FIG. 1, which is stored in a non-transitory computer-readable medium, is executed by one or more processing devices to cause the server system 102 to perform one or more operations described herein.

At step 1802, the layout-modification application identifies an aspect-ratio difference between an initial aspect ratio of the initial document layout and a target aspect ratio indicated by a user device. As described above, the aspect-difference can be an absolute value of a different between the initial aspect ratio and the target aspect ratio. For example, the aspect-ratio difference between the initial aspect ratio (e.g., 300:250=1.2) and the target aspect ratio (e.g., 728:90=8.089) is 6.889. In this example, the layout-modification selects the initial aspect ratio (1.2) and subtracts it from the target aspect ratio (6.689), because the target aspect ratio has the greater value.

At step 1804, the layout-modification application determines that the aspect-ratio difference exceeds a predefined threshold. Continuing with the example, the predefined threshold is 0.7. The layout-modification application uses the predefined threshold (0.7) as input to determine that the aspect-ratio difference between the initial document layout 1602a and the modified document layout 1602c (e.g., 6.889) exceeds the predefined threshold.

At step 1806, the layout-modification application identifies a bounding region of a foreground element of a document. As described above, the bounding region is characterized with a numerical array that identifies a set of location coordinates for its location, as well as the width and height pixel values of the bounding region.

At step 1808, the layout-modification application determines that the initial arrangement of bounding regions should not be modified into a different arrangement of bounding regions for the modified document layout. For example, the layout-modification application determines that the initial arrangement of bounding regions should not be modified into a different arrangement because none of the bounding regions of the initial document layout satisfies two conditions: (i) whether an x-coordinate value of a particular location (e.g., upper-left corner) of the bounding region is greater than an x-coordinate value of the initial document layout that corresponds to a threshold percentage (e.g., 40%) of its width; and (ii) whether the area of the bounding region exceeds an threshold percentage (e.g., 10%) of the area of the initial document layout.

At step 1810, the layout-modification application identifies a center location of the bounding region. Continuing with the example, the layout-modification application identifies an x-axis value of the center location of the bounding region by first dividing the width value of the bounding region by 2, then adding the divided value with the sum of x-axis coordinate value of the left-top corner the bounding region.

At step 1812, the layout-modification application uses the center location as input to determine a reflected location of the bounding region within the modified document layout. In some instances, the layout-modification application determines a width-ratio value based on the height of the initial document layout and the target width. The layout-modification application also determines a height-ratio value based on the width of the initial document layout and the target height. The layout-modification then applies the width-ratio value to the y-coordinate value of the initial bounding region to obtain a new x-coordinate location of the transformed bounding region. Similarly, the layout-modification application applies the height-ratio value to the x-coordinate value of the initial bounding region to obtain a new y-coordinate location of the transformed bounding region. For example, a reflected location, at coordinates (new_element_location_x, new_element_location_y), of the bounding region within the modified document layout is identified based on the following set of equations:

$$\text{scaling\_ratio\_}x = \text{target\_width}/\text{initial\_height}$$

$$\text{new\_element\_location\_}x = \text{source\_element\_location\_}y * \text{scaling\_ratio\_}x$$

$$\text{scaling\_ratio\_}y = \text{target\_height}/\text{initial\_width}$$

$$\text{new\_element\_location\_}y = \text{source\_element\_location\_}x * \text{scaling\_ratio\_}y$$

With respect to the above sets of equations, the target width corresponds to the target width, and the initial_height corresponds to the height of the initial document layout. These two values are used to determine a scaling_ratio_x value, which in turn is used to identify an x-coordinate value (new_element_location_x) of the reflected, center location of the bounding region. Similarly, the target_height corresponds to the target height, and the initial_width corresponds to the width of the initial document layout. These two values are used to determine a scaling_ratio_y value, which in turn is used to identify an y-coordinate value (new_element_location_y) of the reflected, center location of the bounding region.

In some embodiments, steps 1806 to 1812 are performed for other foreground elements, thereby generating reflected locations of the respective bounding regions for the other foreground elements. Process 1800 terminates thereafter.

(e) Resizing of the Foreground Elements from the Intermediate Document Layout to the Modified Document Layout In several embodiments, the layout-modification application attempts to maintain an original size for each foreground document element of the initial document layout, after the initial document layout has been modified to another document layout. However, in response to determining that the original size cannot be maintained (e.g., due to a substantial modification of the document layout), the layout-modification application uses an aspect ratio of the bounding region of the intermediate document layout (source_element_width/source_element_height), such that the aspect ratio (new_element_width/new_element_height) remains the same for the bounding region in the modified document layout:

$$\text{new\_element\_width}/\text{new\_element\_height} = \text{source\_element\_width}/\text{source\_element\_height}$$

This equation is configured to maintain the aspect ratio to stay the same between the modified foreground element and its source foreground element. New_element_width and new_element_height are unknown variables, and source_element_width and source_element_height are known values that can be obtained from the initial document layout.

The layout-modification application also uses an area percentage of the bounding region in the intermediate document layout, such that the area percentage remains the same for the bounding region in the modified document layout. As a result, visual prominence of the foreground element of the bounding region is maintained in the modified document layout. The area percentage for the modified document layout is determined based on a target area calculated from width and height values indicated by the user for generating the modified document layout:

$$(\text{new\_element\_width}*\text{new\_element\_height})/\text{target\_area} = (\text{source\_element\_width}*\text{source\_element\_height})/\text{intermediate\_area}$$

In both examples, the size dimensions (e.g., width, height) of the bounding region for the modified document layout (e.g., new_element_width, new_element_height) are unknown. To identify these size dimensions, the layout-modification application applies the following equations, in which area ratio between the target area and the intermediate document layout is calculated:

$$\text{new\_element\_width} = \text{source\_element\_width} * \sqrt{\frac{\text{target\_area}}{\text{intermediate\_area}}}$$

$$\text{new\_element\_height} = \text{source\_element\_height} * \sqrt{\frac{\text{target\_area}}{\text{intermediate\_area}}}$$

The layout modification application thus solves the two equations using the equation above and deduces the values of new_element_width and new_element_height.

(f) Additional Considerations

While the above examples describes the two columns of the foreground elements being identified and repositioned into a single-column arrangement, it will be appreciated by one skilled in the art that the bounding regions (and therefore the foreground elements) can be repositioned into other types of arrangements in accordance with some embodiments. For example, the layout-modification application determines, in the initial document layout, that the foreground elements are arranged in two rows. The layout-modification application then generates an intermediate document layout in which bounding regions of the foreground elements are arranged into a single row.

Example of a Computing Environment

Figure 19:
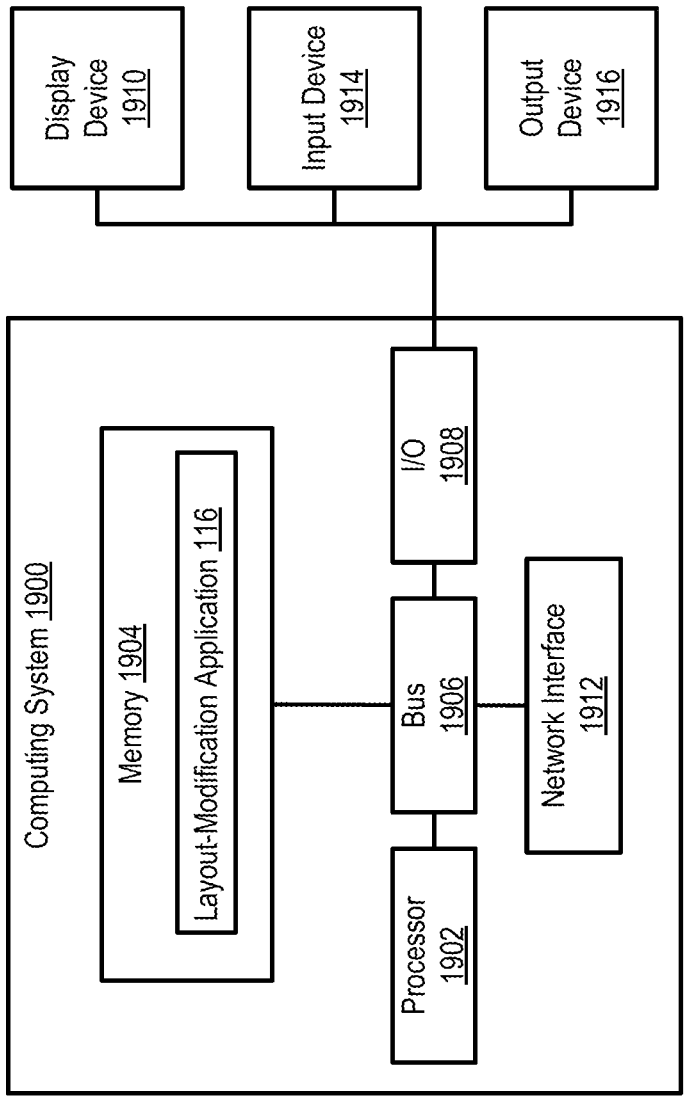
FIG. 19 depicts a computing system configured for transforming document elements for modified document layouts in accordance with some embodiments.

Any suitable computing system or group of computing systems can be used for performing the operations described herein. For example, FIG. 19 depicts a computing system 1900 that can implement any of the computing systems or environments discussed above. In some embodiments, the computing system 1900 includes a processing device 1902 that executes the layout-modification application 116 including the layout-modification application 116, a memory that stores various data computed or used by the layout-modification application 116, an input device 1914 (e.g., a mouse, a stylus, a touchpad, a touchscreen, etc.), and an output device 1916 that presents output to a user (e.g., a display device that displays graphical content generated by the layout-modification application 116). For illustrative purposes, FIG. 19 depicts a single computing system on which the layout-modification application 116 is executed, and the input device 1914 and output device 1916 are present. But these applications, datasets, and devices can be stored or included across different computing systems having devices similar to the devices depicted in FIG. 19.

The example of FIG. 19 includes a processing device 1902 communicatively coupled to one or more memory devices 1904. The processing device 1902 executes computer-executable program code stored in a memory device 1904, accesses information stored in the memory device 1904, or both. Examples of the processing device 1902 include a microprocessor, an application-specific integrated circuit ("ASIC"), a field-programmable gate array ("FPGA"), or any other suitable processing device. The processing device 1902 can include any number of processing devices, including a single processing device.

The memory device 1904 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions could include processor-specific instructions generated by a compiler or an interpreter from code written in any suitable computer-programming language, including, for example, C, C++, C#, Visual Basic, Java, Python, Perl, JavaScript, and ActionScript.

The computing system 1900 could also include a number of external or internal devices, such as a display device 1910, or other input or output devices. For example, the computing system 1900 is shown with one or more input/output ("I/O") interfaces 1908. An I/O interface 1908 can receive input from input devices or provide output to output devices. One or more buses 1906 are also included in the computing system 1900. Each bus 1906 communicatively couples one or more components of the computing system 1900 to each other or to an external component.

The computing system 1900 executes program code that configures the processing device 1902 to perform one or more of the operations described herein. The program code includes, for example, code implementing the layout-modification application 116 or other suitable applications that perform one or more operations described herein. The program code can be resident in the memory device 1904 or any suitable computer-readable medium and can be executed by the processing device 1902 or any other suitable processor. In some embodiments, all modules in the layout-modification application 116 are stored in the memory device 1904, as depicted in FIG. 19. In additional or alternative embodiments, one or more of these modules from the layout-modification application 116 are stored in different memory devices of different computing systems.

In some embodiments, the computing system 1900 also includes a network interface device 1912. The network interface device 1912 includes any device or group of devices suitable for establishing a wired or wireless data connection to one or more data networks. Non-limiting examples of the network interface device 1912 include an Ethernet network adapter, a modem, and/or the like. The computing system 1900 is able to communicate with one or more other computing devices (e.g., a computing device that receives inputs for layout-modification application 116 or displays outputs of the layout-modification application 116) via a data network using the network interface device 1912.

An input device 1914 can include any device or group of devices suitable for receiving visual, auditory, or other suitable input that controls or affects the operations of the processing device 1902. Non-limiting examples of the input device 1914 include a touchscreen, stylus, a mouse, a keyboard, a microphone, a separate mobile computing device, etc. An output device 1916 can include any device or group of devices suitable for providing visual, auditory, or other suitable sensory output. Non-limiting examples of the output device 1916 include a touchscreen, a monitor, a separate mobile computing device, etc.

Although FIG. 19 depicts the input device 1914 and the output device 1916 as being local to the computing device that executes the layout-modification application 116, other implementations are possible. For instance, in some embodiments, one or more of the input device 1914 and the output device 1916 include a remote client-computing device that communicates with the computing system 1900 via the network interface device 1912 using one or more data networks described herein.

General Considerations

Numerous specific details are set forth herein to provide a thorough understanding of the claimed subject matter. However, those skilled in the art will understand that the claimed subject matter could be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages could be used to implement the teachings contained herein in software to be used in programming or configuring a computing device.

Embodiments of the methods disclosed herein can be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values could, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, could readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

What is claimed is:

1. A method comprising:
    identifying, by a layout-modification application and from a document having an initial aspect ratio defined by a first document layout, a first set of measurements of a document element and a first location of the document element within the document;
    receiving, by the layout-modification application, an indication to modify the document to have a target width and a target height;
    determining, by the layout-modification application, an aspect-ratio difference between the initial aspect ratio and a target aspect ratio derived from the target width and the target height;
    selecting, by the layout-modification application and based on the aspect-ratio difference, a set of transformation rules that specify, for the document element, a second set of measurements and a second location;
    applying, by the layout-modification application, the set of transformation rules to the document element to generate a transformed document element that includes the second set of measurements; and
    modifying, by the layout-modification application, the document to have the target width and the target height as defined by a second document layout, wherein the second document layout further specifies that the transformed document element represents the document element at the second location of the modified document.

2. The method of claim 1, wherein identifying a first set of measurements of the document element and a first location of the document element within the first document layout includes:
    generating, by the layout-modification application, a bounding region that surrounds the document element;
    identifying, by the layout-modification application, the first set of measurements by identifying width and height of the bounding region; and
    identifying, by the layout-modification application, the first location by selecting a vertex of the bounding region.

3. The method of claim 1, further comprising:
    classifying, by the layout-modification application, the document element as a background element, wherein classifying the document element as the background element includes:
        determining, by the layout-modification application, that at least three edges of the document contact at least part of the document element; or
        determining, by the layout-modification application, that an area ratio between an area of the document element and the area of the document exceeds a first threshold.

4. The method of claim 3, further comprising determining, by the layout-modification application, that the background element includes an image content, wherein applying the set of transformation rules to the document element includes cropping a portion of the image content of the background element to generate a cropped image content for the transformed document element.

5. The method of claim 3, further comprising determining, by the layout-modification application, that the background element includes a gradient pattern, wherein applying the set of transformation rules to the document element further includes modifying the gradient pattern to generate the transformed document element.

6. The method of claim 3, further comprising:
    determining, by the layout-modification application, that the aspect-ratio difference exceeds a second threshold;
    selecting, by the layout-modification application, another set of transformation rules that specify, for the background element, a degree of reflection; and
    applying, by the layout-modification application, the other set of transformation rules to the background element, thereby generating the transformed document element that includes the background element repositioned at the specified degree of reflection.

7. The method of claim 1, further comprising:
    classifying, by the layout-modification application, the document element as a foreground element, wherein classifying the document element as the foreground element includes:
        determining, by the layout-modification application, that fewer than three edges of the document contact at least part of the document element; or
        determining, by the layout-modification application, that an area ratio between an area of the document element and the area of the document less than a first threshold.

8. The method of claim 7, wherein the first location of the document element corresponds to a location of the foreground element, wherein the location of the foreground element is identified by selecting a center location of the foreground element.

9. A system comprising:
    one or more processors; and
    a memory having stored thereon instructions that, upon execution by the one or more processors, cause the one or more processors to:
        identify, from a document having an initial aspect ratio defined by a first document layout, a first set of measurements of a document element;
        receive an indication to modify the document to have a target width and a target height;
        determine an aspect-ratio difference between the initial aspect ratio and a target aspect ratio derived from the target width and the target height;
        select, based on the aspect-ratio difference, a set of transformation rules that specify, for the document element, a second set of measurements;
        apply the set of transformation rules to the document element to generate a transformed document element that includes the second set of measurements, wherein the transformed document element includes a cropped region of the document element; and modify the document to have the target width and the target height as defined by a second document layout, wherein the second document layout further specifies that the transformed document element represents the document element for the modified document.

10. The system of claim 9, wherein identifying the first set of measurements of the document element for the first document layout includes:

generating a bounding region that surrounds the document element; and identifying the first set of measurements by identifying width and height of the bounding region.

11. The system of claim 9, wherein the instructions further cause the one or more processors to:

classify the document element as a background element, wherein classifying the document element as the background element includes:

determining that at least three edges of the document contact at least part of the document element; or determining that an area ratio between an area of the document element and the area of the document exceeds a first threshold.

12. The system of claim 11, wherein the instructions further cause the one or more processors to determine that the background element includes a fill content, wherein applying the set of transformation rules to the document element includes scaling the cropped region to fit within the target aspect ratio.

13. The system of claim 11, wherein the instructions further cause the one or more processors to determine that the background element includes a gradient pattern, wherein applying the set of transformation rules to the document element further includes modifying the gradient pattern to generate the transformed document element.

14. The system of claim 11, wherein the instructions further cause the one or more processors to:

determine that the aspect-ratio difference exceeds a second threshold;

select another set of transformation rules that specify, for the background element, a degree of reflection; and apply the other set of transformation rules to the background element, thereby generating the transformed document element that includes the background element repositioned at the specified degree of reflection.

15. A computer program product tangibly embodied in a non-transitory machine-readable storage medium including instructions configured to cause one or more data processors to perform actions including:

identifying, from a document having a first document layout, a first set of measurements of a document element and a first location of the document element within the first document layout;

a step for transforming the document element for a second document layout of the document based on a difference between an initial aspect ratio of the first document layout and a target aspect ratio derived from a target width and a target height specified by a client device; and modifying the document to have the target width and the target height as defined by the second document layout, wherein the second document layout specifies that the transformed document element represents the document element for the modified document.

16. The computer program product of claim 15, further comprising instructions configured to cause one or more data processors to perform actions including:

a step for classifying the document element as a foreground element, wherein classifying the document element as the foreground element includes:

determining that fewer than three edges of the document contact at least part of the document element; or determining that an area ratio between an area of the document element and the area of the document is less than a first threshold.

17. The computer program product of claim 16, wherein the first location of the document element correspond to a location of the foreground element, wherein the location of the foreground element is identified by selecting a center location of the foreground element.

18. The computer program product of claim 15, wherein identifying a first set of measurements of the document element and a first location of the document element within the first document layout includes:

a step for generating a bounding region that surrounds the document element;

identifying the first set of measurements by identifying length and width of the bounding region; and identifying the first location by selecting a vertex of the bounding region.

* * * * *